(12) United States Patent
Li et al.

(10) Patent No.: US 10,856,341 B2
(45) Date of Patent: Dec. 1, 2020

(54) WIRELESS COMMUNICATION METHOD, USER EQUIPMENT, AND ACCESS NETWORK DEVICE

(71) Applicant: HUAWEI TECHNOLOGIES CO., LTD., Guangdong (CN)

(72) Inventors: Hong Li, Shanghai (CN); Feng Han, Shanghai (CN); Yinghao Jin, Shanghai (CN); Yang Yang, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 16/369,535

(22) Filed: Mar. 29, 2019

(65) Prior Publication Data

US 2019/0230693 A1    Jul. 25, 2019

Related U.S. Application Data

(63) Continuation of application No. PCT/CN2017/104551, filed on Sep. 29, 2017.

(30) Foreign Application Priority Data

Sep. 30, 2016  (CN) .......................... 2016 1 0874692

(51) Int. Cl.
*H04W 4/50* (2018.01)
*H04W 4/70* (2018.01)
(Continued)

(52) U.S. Cl.
CPC ............. *H04W 76/10* (2018.02); *H04W 4/50* (2018.02); *H04W 4/70* (2018.02); *H04W 8/20* (2013.01);
(Continued)

(58) Field of Classification Search
CPC .... H04L 5/003–0098; H04W 4/50–70; H04W 8/18–245; H04W 28/02–26;
(Continued)

(56) References Cited

U.S. PATENT DOCUMENTS

| 2009/0238107 A1 | 9/2009 | Li et al. |
| 2015/0009826 A1* | 1/2015 | Ma .................... H04W 28/0263 |

(Continued)

FOREIGN PATENT DOCUMENTS

| CN | 1867141 A | 11/2006 |
| CN | 1980150 A | 6/2007 |

(Continued)

OTHER PUBLICATIONS

Samsung et al., "Implicit UE Requested QoS," SA WG2 Meeting #115, S2-163800; Vienna, AT, Jul. 11-15, 2016, 4 pages.

(Continued)

*Primary Examiner* — Timothy J Weidner
(74) *Attorney, Agent, or Firm* — Fish & Richardson P.C.

(57) ABSTRACT

The present disclosure discloses a wireless communication method, user equipment, and an access network device. The method includes: when user equipment (UE) is to transmit an uplink first data flow, if the first data flow is a new data flow and the first data flow belongs to a service pre-authorized to the UE, sending, by the UE, a bearer setup request to an access network device; and receiving, by the UE, a bearer setup response sent by the access network device, where the bearer setup response includes a bearer identifier, and the bearer identifier is an identifier of a bearer that is set up.

18 Claims, 14 Drawing Sheets

(51) Int. Cl.
*H04W 8/20* (2009.01)
*H04W 28/02* (2009.01)
*H04W 28/24* (2009.01)
*H04W 48/08* (2009.01)
*H04W 72/00* (2009.01)
*H04W 72/04* (2009.01)
*H04W 72/06* (2009.01)
*H04W 72/08* (2009.01)
*H04W 72/10* (2009.01)
*H04W 72/12* (2009.01)
*H04W 72/14* (2009.01)
*H04W 76/10* (2018.01)
*H04W 76/11* (2018.01)
*H04W 76/12* (2018.01)
*H04W 76/19* (2018.01)
*H04W 76/22* (2018.01)
*H04W 76/25* (2018.01)
*H04W 76/36* (2018.01)
*H04W 80/04* (2009.01)
*H04W 84/04* (2009.01)
*H04W 88/02* (2009.01)
*H04W 88/08* (2009.01)
*H04W 92/02* (2009.01)
*H04W 92/10* (2009.01)

(52) U.S. Cl.
CPC ... *H04W 28/0247* (2013.01); *H04W 28/0257* (2013.01); *H04W 28/0263* (2013.01); *H04W 28/0268* (2013.01); *H04W 28/24* (2013.01); *H04W 48/08* (2013.01); *H04W 72/005* (2013.01); *H04W 72/042* (2013.01); *H04W 72/044* (2013.01); *H04W 72/0406* (2013.01); *H04W 72/048* (2013.01); *H04W 72/0493* (2013.01); *H04W 72/06* (2013.01); *H04W 72/08* (2013.01); *H04W 72/10* (2013.01); *H04W 72/1257* (2013.01); *H04W 72/1263* (2013.01); *H04W 72/1268* (2013.01); *H04W 72/1278* (2013.01); *H04W 72/1289* (2013.01); *H04W 72/14* (2013.01); *H04W 76/11* (2018.02); *H04W 76/12* (2018.02); *H04W 76/19* (2018.02); *H04W 76/22* (2018.02); *H04W 76/25* (2018.02); *H04W 76/36* (2018.02); *H04W 80/04* (2013.01); *H04W 84/04* (2013.01); *H04W 88/02* (2013.01); *H04W 88/08* (2013.01); *H04W 92/02* (2013.01); *H04W 92/10* (2013.01)

(58) Field of Classification Search
CPC ... H04W 48/02–20; H04W 72/005–14; H04W 76/10–50; H04W 80/02; H04W 80/04; H04W 84/02; H04W 84/04–045; H04W 88/02; H04W 88/08; H04W 88/12–18; H04W 92/02–14
See application file for complete search history.

(56) References Cited

U.S. PATENT DOCUMENTS

2016/0157280 A1* 6/2016 Avila Gonzalez .... H04W 76/15
2017/0289046 A1* 10/2017 Faccin ............. H04W 28/0268

FOREIGN PATENT DOCUMENTS

CN 1980165 A 6/2007
EP 2672752 A1 12/2013
EP 2733908 A1 5/2014
WO 2010029827 A1 3/2010

OTHER PUBLICATIONS

EPO Communication pursuant to Article 94(3) EPC issued in European Application No. 17855009.1 dated Mar. 20, 2020, 7 pages.
3GPP TR 23.799 V0.5.0 (May 2016);3rd Generation Partnership Project;Technical Specification Group Services and System Aspects;Study on Architecture for Next Generation System(Release 14),total 178 pages.
3GPP TR 23.799 V0.7.0 (Aug. 2016);3rd Generation Partnership Project;Technical Specification Group Services and System Aspects;Study on Architecture for Next Generation System(Release 14),total 323 pages.
PCT International Search Report in International Appln. No. PCT/CN2017/104551, dated Dec. 29, 2017, 14 pages (with English translation).
Extended European Search Report issued in European Application No. 17855009.1 dated Jul. 12, 2019, 8 pages.

* cited by examiner

WIRELESS COMMUNICATION METHOD, USER EQUIPMENT, AND ACCESS NETWORK DEVICE

CROSS-REFERENCE TO RELATED APPLICATIONS

This application is a continuation of International Application No. PCT/CN2017/104551, filed on Sep. 29, 2017, which claims priority to Chinese Patent Application No. 201610874692.1, filed on Sep. 30, 2016. The disclosures of the aforementioned applications are hereby incorporated by reference in their entireties.

TECHNICAL FIELD

The present invention relates to the field of wireless network communications, and in particular, to a wireless communication method, user equipment, an access network device, and a network system.

BACKGROUND

Quality of Service (Quality of Service, QoS for short) of an existing LTE system is managed based on a bearer to ensure end-to-end QoS. The bearer is a logical set of one or more service data flows between user equipment (User Equipment, UE for short) and a packet data network gateway (Packet Data Network Gateway, P-GW for short). Service data flows mapped onto a same evolved packet system (Evolved Packet System, EPS for short) for a bearing purpose will undergo same packet forwarding treatment (such as a scheduling policy, a queue management policy, a rate adjustment policy, and an RLC configuration). In the LTE system, several bearers may be used to ensure the QoS from the P-GW to the UE, including an S5/S8 bearer between the P-GW and a serving gateway (Serving Gateway, S-GW for short), an S1 bearer between the S-GW and an evolved NodeB (Evolved Node B, eNB for short), and a radio bearer between the eNB and the UE. The S5/S8 bearer, the S1 bearer, and the radio bearer are collectively referred to as an EPS bearer, and an attribute of the EPS bearer is provided by the P-GW. An attribute of the bearer is corresponding to a QoS processing mode, and data on a same bearer is provided with same data packet forwarding treatment. In a downlink direction, the P-GW maps the service data flow onto the EPS bearer. On the S5/S8 bearer, the S1 bearer, and the radio bearer, the attribute of the EPS bearer is used to ensure a QoS requirement of a service. In the existing LTE system, QoS control of data transmission is performed by using a bear-based granularity, and a plurality of Internet Protocol (Internet Protocol, IP for short) flows are mapped onto one EPS bearer. The EPS bearer is a minimum unit for QoS control; in other words, QoS differentiation is not performed on data flows in a same EPS bearer. The radio bearer, the S1 bearer, and the S5/S8 bearer between the UE and the P-GW use a 1:1 mapping manner.

In the existing LTE system, QoS control of data transmission is performed by using an EPS bearer-based granularity, a plurality of IP flows are mapped onto one EPS bearer, and the EPS bearer/E-RAB is a minimum unit that is used for QoS control of a bearer level and that is in the EPS; in other words, QoS differentiation is not performed on the data flows on a same EPS bearer. An air interface bearer, an AN bearer, and a CN bearer between the UE and the P-GW use a 1:1 mapping manner. If a new data flow needs to be transmitted, and the data flow cannot be mapped onto an existing data bearer, a dedicated EPS data bearer needs to be set up. To set up an EPS data bearer, signaling interaction needs to be performed many times between the UE and a network (which includes a core network and an access network), many network functional units are used, and signaling overheads are relatively high. In addition, high latency is caused, and this is not suitable for some services that are sensitive to latency or services that need to be transmitted in time but whose data volumes are not large.

SUMMARY

The present invention provides a wireless communication method, user equipment, an access network device, and a network system.

According to a first aspect, an embodiment of the present invention provides a wireless communication method, including the following steps: when user equipment UE needs to transmit an uplink first data flow, if the first data flow is a new data flow and the first data flow belongs to a service pre-authorized to the UE, sending, by the UE, a bearer setup request to an access network device; and receiving, by the UE, a bearer setup response sent by the access network device, where the bearer setup response includes a bearer identifier, and the bearer identifier is an identifier of a bearer that is set up.

For a pre-authorized service, the UE may directly request an access network to set up a bearer for the pre-authorized service. Compared with the prior art, a QoS authorization process may be omitted, and bearer setup does not require participation of a core network, so that bearer setup time is reduced, and data sending latency is shortened.

In a possible design, the bearer setup request includes a descriptor of the first data flow, and the descriptor of the first data flow is used to describe a property of the service of the first data flow; and a Quality of Service QoS parameter configured for the bearer that is set up is able to support a QoS requirement of the service corresponding to the first data flow.

The bearer setup request includes a descriptor of a data flow. The access network device may determine a property and a QoS requirement of a data flow requested by the UE, and may further determine whether a service corresponding to the data flow is pre-authorized, and set up an appropriate bearer.

In a possible design, before the sending, by the UE, a bearer setup request to an access network device, the method further includes: receiving, by the UE, pre-authorized Quality of Service information, where the pre-authorized Quality of Service information includes information about the service pre-authorized to the UE.

By receiving the pre-authorized Quality of Service information in advance, when initiating uplink data flow transmission, the UE may first locally check whether the data flow is a pre-authorized service, so as to determine whether to subsequently initiate QoS authorization or bearer setup. This saves time and improves efficiency.

In a possible design, the method further includes: sending, by the UE, a second data flow to the access network device by using the bearer that is set up, where the second data flow and the first data flow have a same Quality of Service attribute, or the second data flow is able to be mapped onto the bearer that is set up.

The bearer that is set up may be used not only for the first data flow, but also for the second data flow that has the same Quality of Service attribute as the first data flow or that is mapped onto the bearer. A plurality of data flows share one bearer, so that bearers can be saved, and overheads for setting up and maintaining the bearer can be reduced.

According to a second aspect, an embodiment of the present invention provides a wireless communication method, including the following steps: receiving, by an access network device, a bearer setup request sent by user equipment UE, where the bearer setup request is triggered when the UE transmits a first data flow; and if the first data flow is a new data flow and the first data flow belongs to a service pre-authorized to the UE, sending, by the access network device, a bearer setup response to the UE, where the bearer setup response includes a bearer identifier, and the bearer identifier is an identifier of a bearer that is set up.

In a possible design, setup of the bearer that is set up is initiated by the access network device. The bearer is set up only by the access network device, and does not require participation of a core network, so that signaling interaction is reduced, and latency is reduced. In addition, a scenario in which an access network and a core network use different transmission modes can be supported.

In a possible design, the bearer setup request includes a descriptor of the uplink first data flow of the UE, and the descriptor of the first data flow is used to describe a property of the service of the first data flow; and a Quality of Service parameter configured for the bearer that is set up is able to support the service corresponding to the first data flow.

In a possible design, before the receiving, by an access network device, a bearer setup request sent by user equipment UE, the method further includes: receiving, by the access network device, pre-authorized Quality of Service information, where the pre-authorized Quality of Service information includes information about the service pre-authorized to the UE.

In a possible design, the method further includes: receiving, by the access network device by using the bearer that is set up, a second data flow sent by the UE, where the second data flow and the first data flow have a same Quality of Service attribute, or the second data flow is able to be mapped onto the bearer that is set up.

In a possible design, the method further includes: sending, by the access network device, the second data flow to a core network device in a form of a flow. This design is applicable to a scenario in which the access network performs transmission based on a bearer, and the core network performs transmission based on a flow.

In a possible design, the method further includes: demapping, by the access network device, the second data flow.

In a possible design, the method further includes: sending, by the access network device, the second data flow to the core network device by using the bearer that is set up.

According to a third aspect, an embodiment of the present invention provides user equipment UE, including a transmitter and a receiver, where the transmitter is configured to: when the UE needs to transmit an uplink first data flow, if the first data flow is a new data flow and the first data flow belongs to a service pre-authorized to the UE, send a bearer setup request to an access network device; and the receiver is configured to receive a bearer setup response sent by the access network device, where the bearer setup response includes a bearer identifier, and the bearer identifier is an identifier of a bearer that is set up.

In a possible design, the bearer setup request includes a descriptor of the first data flow, and the descriptor of the first data flow is used to describe a property of the service of the first data flow; and a Quality of Service QoS parameter configured for the bearer that is set up is able to support a QoS requirement of the service corresponding to the first data flow.

In a possible design, the receiver is further configured to receive pre-authorized Quality of Service information, where the pre-authorized Quality of Service information includes information about the service pre-authorized to the UE.

In a possible design, the transmitter is further configured to send a second data flow to the access network device by using the bearer that is set up, where the second data flow and the first data flow have a same Quality of Service attribute, or the second data flow is able to be mapped onto the bearer that is set up.

According to a fourth aspect, an embodiment of the present invention provides an access network device, including a receiver and a transmitter, where the receiver is configured to receive a bearer setup request sent by user equipment UE, where the bearer setup request is triggered when the UE transmits a first data flow; and if the first data flow is a new data flow and the first data flow belongs to a service pre-authorized to the UE, the transmitter is configured to send a bearer setup response to the UE, where the bearer setup response includes a bearer identifier, and the bearer identifier is an identifier of a bearer that is set up.

In a possible design, setup of the bearer that is set up is initiated by the access network device.

In a possible design, the bearer setup request includes a descriptor of the uplink first data flow of the UE, and the descriptor of the first data flow is used to describe a property of the service of the first data flow; and a Quality of Service parameter configured for the bearer that is set up is able to support the service corresponding to the first data flow.

In a possible design, the receiver is further configured to receive pre-authorized Quality of Service information, where the pre-authorized Quality of Service information includes information about the service pre-authorized to the UE.

In a possible design, the receiver is further configured to receive, by using the bearer that is set up, a second data flow sent by the UE, where the second data flow and the first data flow have a same Quality of Service attribute, or the second data flow is able to be mapped onto the bearer that is set up.

According to a fifth aspect, an embodiment of the present invention provides a wireless communication method, including: when user equipment UE needs to transmit an uplink first data flow, if the first data flow is a new data flow but the first data flow does not belong to a service pre-authorized to the UE, sending, by the UE, a Quality of Service QoS authorization request to an access network device; and receiving, by the UE, a QoS authorization response sent by the access network device.

For a data flow that does not fall within a pre-authorized scope, the UE initiates the QoS authorization request, and directly triggers bearer setup on an access network after authorization succeeds. Compared with an existing bearer setup process, a procedure is relatively simple and less signaling interaction is needed.

In a possible design, the QoS authorization request includes a descriptor of the first data flow and QoS information corresponding to the first data flow, and the descriptor of the first data flow is used to describe a property of a service of the first data flow; and the QoS authorization response includes authorized QoS information. By using this design, a QoS requirement can be defined.

In a possible design, before the sending, by the UE, a bearer setup request to an access network device, the method further includes: receiving, by the UE, pre-authorized Quality of Service information, where the pre-authorized Quality of Service information includes information about the service pre-authorized to the UE.

In a possible design, the method further includes: receiving, by the UE, an identifier of a bearer that is set up, where QoS configured for the bearer is authorized QoS. After obtaining the bearer identifier, the UE may put a corresponding data flow on the bearer for transmission. Therefore, a corresponding QoS requirement is ensured.

In a possible design, the method further includes: sending, by the UE, a second data flow to the access network device by using the bearer, where the second data flow and the first data flow have a same Quality of Service attribute, or the second data flow is able to be mapped onto the bearer that is set up.

According to a sixth aspect, an embodiment of the present invention provides a wireless communication method, including the following steps: receiving, by an access network device, a Quality of Service QoS authorization request that is sent by user equipment UE for transmitting a first data flow; if the first data flow is a new data flow but the first data flow does not belong to a service pre-authorized to the UE, sending, by the access network device, the QoS authorization request to a policy functional entity; receiving, by the access network device, a QoS authorization response sent by the policy functional entity; and sending, by the access network device, the QoS authorization response to the UE.

After receiving a QoS request of the UE, the access network device initiates an authorization request to the PF, so as to provide QoS authorization for a service that is not a pre-authorized service, thereby accelerating a data transmission process. In addition, a bearer setup process may be triggered after authorization succeeds. An entire bearer setup process is completed inside an access network, and the method may support AN and CN independent evolution architectures.

In a possible design, setup of the bearer that is set up is initiated by the access network device. The bearer is set up only by the access network device, and does not require participation of a core network, so that signaling interaction is reduced, and latency is reduced. A scenario in which the access network and the core network use different transmission modes can be supported.

In a possible design, the QoS authorization request includes a descriptor of the first data flow and QoS information corresponding to the first data flow, and the descriptor of the first data flow is used to describe a property of a service of the first data flow; and the QoS authorization response includes information about performing QoS authorization on the first data flow.

In a possible design, before the receiving, by an access network device, a Quality of Service QoS authorization request sent by user equipment UE, the method further includes: receiving, by the access network device, pre-authorized Quality of Service information, where the pre-authorized Quality of Service information includes information about the service pre-authorized to the UE.

In a possible design, the method further includes: sending, by the access network device, an identifier of the bearer that is set up to the UE, where QoS configured for the bearer that is set up is authorized QoS.

In a possible design, the method further includes: receiving, by the access network device by using the bearer that is set up, a second data flow sent by the UE, where the second data flow and the first data flow have a same Quality of Service attribute, or the second data flow is able to be mapped onto the bearer that is set up.

In a possible design, the method further includes: sending, by the access network device, the second data flow to a core network device in a form of a flow.

In a possible design, the method further includes: demapping, by the access network device, the second data flow.

In a possible design, the method further includes: sending, by the access network device, the second data flow to the core network device by using the bearer that is set up.

According to a seventh aspect, an embodiment of the present invention provides a wireless communication method, including the following steps: receiving, by a policy functional entity, a Quality of Service QoS authorization request sent by the access network device, where the QoS authorization request includes an identifier of a user, a descriptor of an uplink first data flow of the user, and QoS information corresponding to the first data flow, and the descriptor of the first data flow is used to describe a property of a service of the first data flow; and sending, by the policy functional entity, a QoS authorization response to the access network device.

The policy functional entity performs authorization control, so as to ensure network security and improve network resource utilization efficiency.

In a possible design, the QoS authorization response includes information about authorized QoS.

In a possible design, the policy functional entity sends pre-authorized Quality of Service information, where the pre-authorized Quality of Service information includes information about a service pre-authorized to the UE. The receiving, by a policy functional entity, a Quality of Service QoS authorization request sent by the access network device includes: when the uplink first data flow of the user equipment UE is a new data flow and the first data flow does not belong to the service pre-authorized to the UE, receiving, by the policy functional entity, the Quality of Service QoS authorization request sent by the access network device.

According to an eighth aspect, an embodiment of the present invention provides a wireless communication method, where the method includes the following steps: sending, by user equipment UE, an uplink first data flow to an access network device by using a default bearer; and if the first data flow is a new data flow and the first data flow does not belong to a service that is pre-authorized to the UE, receiving, by the UE, an identifier of a dedicated bearer that is set up, where QoS configured for the dedicated bearer is QoS authorized to the UE.

Before obtaining QoS authorization, the UE may first transmit data on a default bearer. A network may buffer the data sent by the UE, and initiate a QoS authorization request. After the QoS authorization succeeds, the network may then send the data by using a dedicated bearer that is set up. In this way, in a process of QoS authorization, the UE may send some data, so as to reduce data sending latency. In addition, setup of the dedicated bearer can be triggered without additional signaling, which accelerates setup of the dedicated bearer. The dedicated bearer can ensure better QoS.

In a possible design, before the sending, by the UE, a bearer setup request to an access network device, the method further includes: receiving, by the UE, pre-authorized Quality of Service information, where the pre-authorized Quality of Service information includes information about the service pre-authorized to the UE.

In a possible design, the method further includes: sending, by the UE, a second data flow to the access network device by using the bearer that is set up, where the second data flow and the first data flow have a same Quality of Service attribute, or the second data flow is able to be mapped onto the bearer that is set up.

According to a ninth aspect, an embodiment of the present invention provides a wireless communication method, including the following steps: receiving, by an access network user plane functional entity, a first data flow on a default bearer; sending, by the access network user plane functional entity, information about the first data flow to an access network control plane functional entity, so that the access network control plane functional entity obtains QoS authorization of the first data flow; and receiving, by the access network user plane functional entity, authorized QoS information sent by the access network control plane functional entity, where the authorized QoS information includes information about QoS authorization.

In a possible design, the method further includes the following step: receiving, by the access network user plane functional entity, an identifier of a dedicated bearer sent by the access network control plane functional entity, where QoS configured for the dedicated bearer is authorized QoS.

In a possible design, the method further includes the following step: receiving, by the access network user plane functional entity by using the dedicated bearer, a second data flow sent by UE, where the second data flow and the first data flow have a same Quality of Service attribute, or the second data flow is able to be mapped onto a bearer that is set up.

In a possible design, the method further includes the following step: sending, by the access network device user plane functional entity, the second data flow to a core network device in a form of a flow.

According to a tenth aspect, an embodiment of the present invention provides a wireless communication method, including the following steps: receiving, by an access network control plane functional entity, information about a first data flow sent by an access network user plane functional entity; obtaining, by the access network control plane functional entity, QoS authorization of the first data flow; and sending, by the access network control plane functional entity, authorized QoS information to the access network user plane functional entity, where the authorized QoS information includes QoS authorization information of the first data flow.

In a possible design, the obtaining, by the access network control plane functional entity, QoS authorization of the first data flow includes: sending, by the access network control plane functional entity, a QoS authorization request to a policy functional entity; and receiving, by the access network control plane functional entity, a QoS authorization response sent by the policy functional entity, where the QoS authorization response includes the authorized QoS information.

In a possible design, the access network user plane functional entity sends an identifier of a dedicated bearer to the access network control plane functional entity, where QoS configured for the dedicated bearer is authorized QoS.

According to an eleventh aspect, an embodiment of the present invention provides an apparatus, including a transmitter and a receiver, where the transmitter is configured to implement sending steps in the methods according to any one of the fifth to the tenth aspects, and the receiver is configured to implement receiving steps in the methods according to any one of the fifth to the tenth aspects.

DESCRIPTION OF EMBODIMENTS

Figure 1:
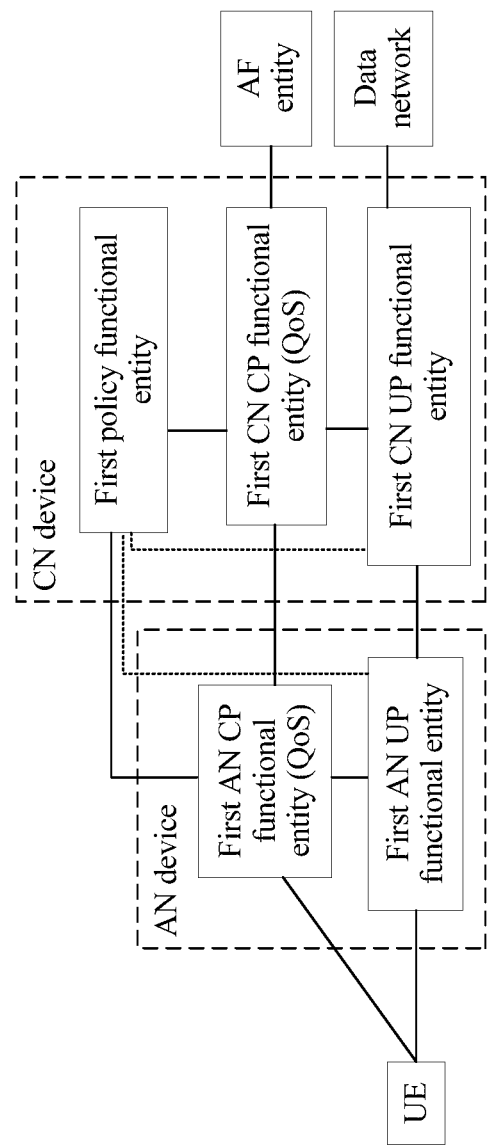
FIG. 1 is a schematic diagram of a wireless communications system according to an embodiment of this application.

The following clearly describes the technical solutions in the embodiments of the present invention with reference to the accompanying drawings in the embodiments of the present invention. Apparently, the described embodiments are merely some but not all of the embodiments of the present invention. The following several specific embodiments may be combined with each other, and a same or similar concept or process may not be described repeatedly in some embodiments. All other embodiments obtained by a person of ordinary skill in the art based on the embodiments of the present invention without creative efforts shall fall within the protection scope of the present invention.

In this application, the word "exemplary" is used to represent giving an example, an illustration, or a description. Any "exemplary" embodiment described in this application shall not be construed as being advantageous over other embodiments. To enable any person skilled in the art to implement and use the present invention, the following description is provided. In the following description, details are set forth for the purpose of explanation. It should be understood by a person of ordinary skill in the art that the present invention can be implemented without these specific details. In other instances, well-known structures and processes are not described in detail to avoid obscuring the description of the present invention with unnecessary details. Therefore, the present invention is not limited to the described embodiments but extends to the widest scope that complies with the principles and novelty disclosed in this application.

In the specification, claims, and accompanying drawings of the present invention, the terms "first", "second", "third", "fourth", and so on (if existent) are intended to distinguish between similar objects but do not necessarily indicate a specific order or sequence. It should be understood that the data termed in such a way are interchangeable in proper circumstances so that the embodiments of the present invention described herein can be implemented in other orders than the order illustrated or described herein. In addition, the terms "include", "contain", and any other variants mean to cover the non-exclusive inclusion, for example, a process, method, system, product, or device that includes a list of steps or units is not necessarily limited to those expressly listed steps or units, but may include other steps or units not expressly listed or inherent to such a process, method, system, product, or device.

The terms "system" and "network" may be used interchangeably in this specification. The term "and/or" in this specification describes only an association relationship between associated objects and represents that three relationships may exist. For example, A and/or B may represent the following three cases: Only A exists, both A and B exist, and only B exists. In addition, the character "/" in this specification generally indicates an "or" relationship between the associated objects.

In this specification, the term "pre-authorized QoS" means specified-level QoS, pre-authorized by a network, corresponding to data transmission of some specific services of UE. This may be used as a part of subscription content of a user. When the UE initiates the specific service, QoS authorization of the service is not performed. For example, for some users, when corresponding UE initiates a health monitoring service, the network may directly pre-authorize a relatively high QoS level for the service; in this way, when the UE initiates a corresponding service, the network side may directly set up a dedicated bearer for the UE without re-performing a service authorization process.

In this specification, the term "connection" may be a direct connection or an indirect connection. "Functional entity" refers to an entity that implements a function and includes a corresponding hardware structure and/or software module for performing the function.

In this specification, the term "bearer" is a data transmission channel that is corresponding to QoS and that is set up by a network to implement differentiated data transmission. A bearer may be implemented as a data tunnel, for example, a logical data transmission channel that is set up between a source node and a destination node of data transmission and that is based on a GPRS tunneling protocol (GPRS Tunneling Protocol, GTP for short). All data flows on a bearer are not distinguished in terms of QoS control, undergo same data packet forwarding treatment, and are transmitted based on a transmission protocol corresponding to a transmission channel. The more data flows are mapped onto a bearer, the fewer bearers need to be set up, and correspondingly, the lower signaling overheads are needed. To some extent, signaling overheads can be reduced. However, QoS differentiation cannot be performed on data flows that are mapped onto a bearer, that is, a QoS control granularity is relatively large. More fine-grained QoS control and differentiation may be implemented for the data flow, but this may result in high signaling overheads, especially in an access network. The present invention is applicable to a scenario in which an AN uses a bearer and a CN uses a data flow. The present invention is also applicable to a scenario in which both the AN and the CN use bearers.

In this specification, the term "data flow" refers to service-related application data that is generated by UE or a data network, for example, an IP flow. To be transferred to a peer end, data needs to be transmitted by using a network. The network converts upper-layer data into a form that is suitable for transmission on the network. A data flow-based transmission mode means that: For data packets in a same flow, the network uses same data packet forwarding treatment (packet forwarding treatment), and uses a same QoS rule for processing. Different from a bear-based QoS control manner, different data flows may be mapped onto a same bearer, and QoS differentiation is not performed on the data flows on the same bearer. A mapping manner between a data flow and a bearer may be 1:1, or may be N:1. A mapping manner may further be related to a QoS attribute of the data flow. For example, a 1:1 mapping manner is used for a data flow that has a guaranteed bit rate (guaranteed bit rate, GBR for short), and an N:1 mapping manner is used for a data flow that has a non-guaranteed bit rate (non-guaranteed bit rate, non-GBR for short).

Performing transmission in a form of a data flow may achieve more fine-grained QoS control and differentiation, but may cause relatively high signaling overheads. One or more data flows may be mapped onto one bearer, and signaling overheads may be reduced by performing bearer-based transmission. The more data flows are mapped onto a bearer, the fewer bearers need to be set up by the network, and correspondingly, the lower signaling overheads are needed. However, QoS differentiation is not performed on the data flows on the same bearer. Therefore, a QoS control and differentiation granularity of the bear-based transmission mode is relatively coarse.

In this specification, the term "QoS rule" is a set of information that is formulated based on an application requirement and a QoS parameter according to a carrier policy, and is used to detect a service data flow and define a related QoS parameter of the service data flow, and determine a transmission mode of the data flow. The transmission mode of the data flow may include a data-flow-based transmission mode or a bearer-based transmission mode. In the data-flow-based transmission mode, a data packet of a data flow may be transmitted according to an IP transmission protocol. In the bearer-based transmission mode, one or more data flows may be mapped onto one bearer for transmission.

The QoS rule may include QoS requirement information of the data flow and/or the transmission mode of the data flow, for example, the bearer-based transmission mode or the data-flow-based transmission mode. The QoS requirement information may include a data rate, transmission latency, and the like. The QoS rule may further include a data flow to bearer mapping relationship.

In this specification, the term "QoS control function" may include one or more of the following: a QoS rule formulation function, a QoS rule distribution function, a QoS parameter configuration function, or the like. The QoS parameter configuration function includes QoS parameter configuration function of a data flow and QoS configuration function of a bearer, and is used to configure a QoS parameter for the data flow or the bearer.

In this specification, the term "flow mapping" means that mapping one or more data flows with same or similar QoS onto one bearer, and each bearer is corresponding to a set of QoS parameters. The QoS parameter may include a QoS class identifier (Quality Class Indicator, QCI for short) of a service, a maximum bit rate (Maximum Bit Rate, MBR for short), an allocation/retention priority (Allocation/Retention Priority, ARP for short), and the like, and is used to indicate a manner in which the network processes data on the bearer. Data on a same bearer undergoes same data forwarding treatment. A core network user plane (Core Network Control Plane, AN CP for short) functional entity and a UE user plane functional entity may map a plurality of data flows with different QoS onto one or more bearers. The CN UP functional entity, an AN CP functional entity, and the UE user plane functional entity may perform a flow demapping operation.

In this specification, the term "flow demapping" is an inverse process of flow mapping, that is, restoring data on a bearer to different data flows by flow demapping. It should be noted that a flow mapping process and a flow demapping process each are an optional operations, and each user plane functional entity determines, based on the obtained QoS rule, whether to perform such a corresponding operation.

Specific embodiments are used below to describe in detail the technical solutions of the present invention. The following several specific embodiments may be combined with each other, and a same or similar concept or process may not be described repeatedly in some embodiments.

FIG. 1 is a schematic diagram of a wireless communications system according to an embodiment of the present invention. The wireless communications system includes UE, an access network (Access Network, AN for short) device, and a core network (Core Network, CN for short) device. The UE is connected to the AN device by using an air interface. The AN device and the CN device may be connected in a wired or wireless manner. The UE implements a communications service of a data flow by using the AN device and the CN device.

The UE in this embodiment of this application may also be referred to as a terminal device, an access terminal, a subscriber unit, a subscriber station, a mobile station, a terminal device, a remote station, a remote terminal, a mobile device, a user terminal, a terminal, a wireless communications device, a user agent, or a user apparatus. The access terminal may be a cellular phone, a cordless phone, a Session Initiation Protocol (Session Initiation Protocol, "SIP" for short) phone, a wireless local loop (Wireless Local Loop, "WLL" for short) station, a personal digital assistant (Personal Digital Assistant, "PDA" for short), a handheld device having a wireless communications function, a computing device, another processing device connected to a wireless modem, an in-vehicle device, a wearable device, a terminal device in a future 5G network, a terminal device in a future evolved public land mobile network (Public Land Mobile Network, "PLMN" for short), or the like.

The AN device in this embodiment of this application may be a device configured to communicate with the terminal device. The AN device may be a base transceiver station (Base Transceiver Station, "BTS" for short) in GSM or CDMA, or may be a NodeB (NodeB, "NB" for short) in a WCDMA system, or may be an evolved NodeB (evolved NodeB, "eNB or eNodeB" for short) in an LTE system, or may be a radio controller in a cloud radio access network (Cloud Radio Access Network, "CRAM" for short) scenario. The AN device may alternatively be a relay station, an access point, an in-vehicle device, a wearable device, an AN device in a future 5G network, an AN device in a future evolved network, or the like. The AN device may alternatively be a next-generation Node B (Next-generation Node B, gNB for short), and a transmit and receive point (Transmit and Receive Point, TRP for short), a central unit device (Central Unit, CU for short), a distributed unit device (Distributed Unit, DU for short), or the like.

In the embodiment shown in FIG. 1, the AN device includes a first access network control plane (Access Network Control Plane, AN CP for short) functional entity and a first access network user plane functional entity (Access Network User Plane, AN UP for short). The AN CP functional entity is connected to the AN UP functional entity. The AN CP functional entity has a QoS control function, and can control QoS processing of the AN UP functional entity. The AN CP functional entity may send a QoS rule to the AN UP functional entity. The AN UP functional entity transmits data based on the received QoS rule.

The CN device may be a gateway, a router, a data center, a server, a network management device, or the like. In the embodiment shown in FIG. 1, the CN device includes a first policy functional entity, a first core network control plane (Core Network Control Plane, CN CP for short) functional entity, and a first core network user plane (Core Network User Plane, CN UP for short) functional entity. The first policy functional entity is configured to formulate a corresponding QoS control policy based on subscription information of a user and a carrier policy, perform service QoS authorization on a received QoS authorization request, and the like. The first policy functional entity is separately connected to the AN CP functional entity and the CN CP functional entity. The first policy functional entity is configured to send QoS authorization information to the AN CP functional entity and the CN CP functional entity. Optionally, the first policy functional entity may further be separately connected to the AN UP functional entity and the CN UP functional entity, and is configured to send the QoS authorization information to the AN UP functional entity and the CN UP functional entity.

The CN CP functional entity is connected to the CN UP functional entity. The CN CP functional entity has a QoS control function, and can control QoS processing of the CN UP functional entity. The CN CP functional entity may send a QoS rule to the CN UP functional entity. The CN UP functional entity transmits data based on the received QoS rule.

In the embodiment shown in FIG. 1, both the AN device and the CN device have logically independent QoS control functions that are respectively implemented by using the AN CP functional entity and the CN CP functional entity. The AN CP functional entity and the CN CP functional entity have similar QoS control functions, but their control ranges are different. The CN CP functional entity mainly controls the QoS processing of the CN UP functional entity, and the AN CP functional entity mainly controls the QoS processing of the AN UP functional entity. Resources of a core network and an access network are different. The core network and the access network can implement their own flexible QoS management functions by using different QoS control methods based on their respective resource usage.

The foregoing wireless communications system may further communicate with an application function (Application Function, AF for short) entity and a data network (Data Network, DN for short). The AF entity may provide a data flow service with a specific QoS requirement, and is similar to an application server. The AF entity may be deployed by a network operator, or may be deployed by a third party. The data network may provide a type of data service, is generally an external network, and is similar to a packet data network (Packet Data Network, PDN for short). A type of the data network includes but is not limited to: the Internet (English:

Internet) and an IP multimedia subsystem (English: IP Multimedia Subsystem, IMS for short).

In this embodiment, the AN has its own QoS management function, independently manages and controls data transmission of the AN user plane, improves flexibility of service QoS management in a wireless communications network, and provides a possibility of independent evolution of QoS frameworks of the CN and a RAN.

Figure 2:
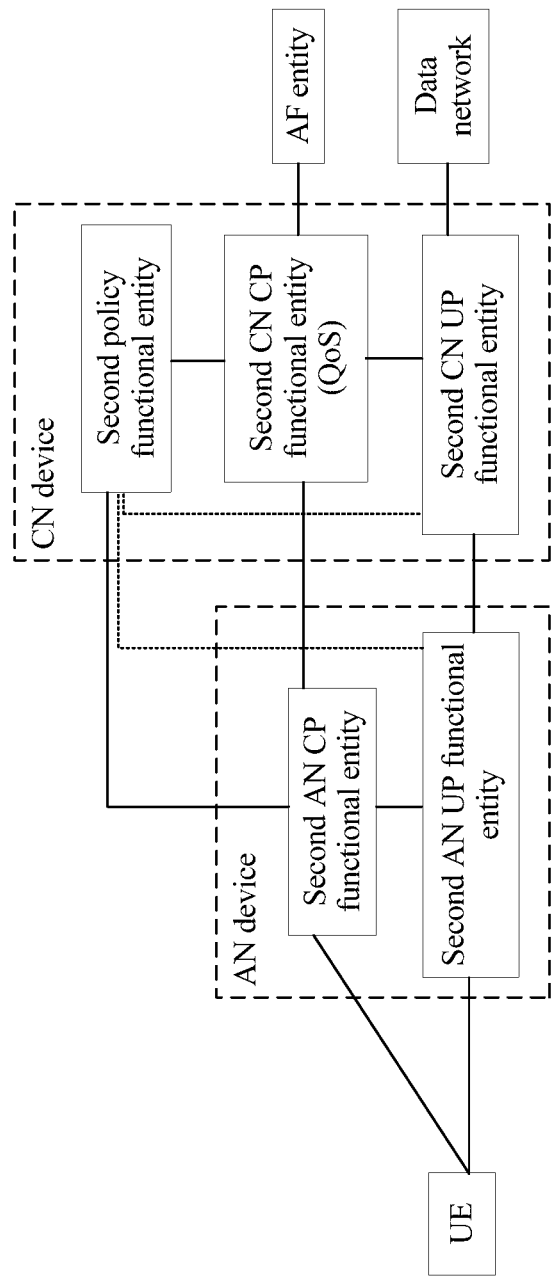
FIG. 2 is a schematic diagram of a wireless communications system according to another embodiment of this application.

FIG. 2 is a schematic diagram of another wireless communications system according to an embodiment of the present invention. The wireless communications system includes UE, an AN device, and a CN device. The AN device includes a second AN CP functional entity and a second AN UP functional entity. The CN device includes a second policy functional entity, a second CN CP functional entity, and a second CN UP functional entity. A core difference between this embodiment and the embodiment shown in FIG. 1 lies in that: the second AN CP functional entity does not have a QoS control function. Correspondingly, the second CN CP functional entity that has a QoS control function sends a QoS rule to the second AN UP functional entity and the second CN UP functional entity. The second AN UP functional entity and the second CN UP functional entity correspondingly transmit data based on the received QoS rule.

The following describes in detail a communication method of the embodiments of the present invention. The embodiments shown in FIG. 3 to FIG. 6 may be applied to the network system shown in FIG. 1. An AN CP in FIG. 3 to FIG. 6 may be the first AN CP functional entity in FIG. 1, an AN UP may be the first AN UP functional entity in FIG. 1, a CN CP may be the first CN CP functional entity in FIG. 1, a CN UP may be the first CN UP functional entity in FIG. 1, and a PF may be the first PF functional entity in FIG. 1.

Figure 3:
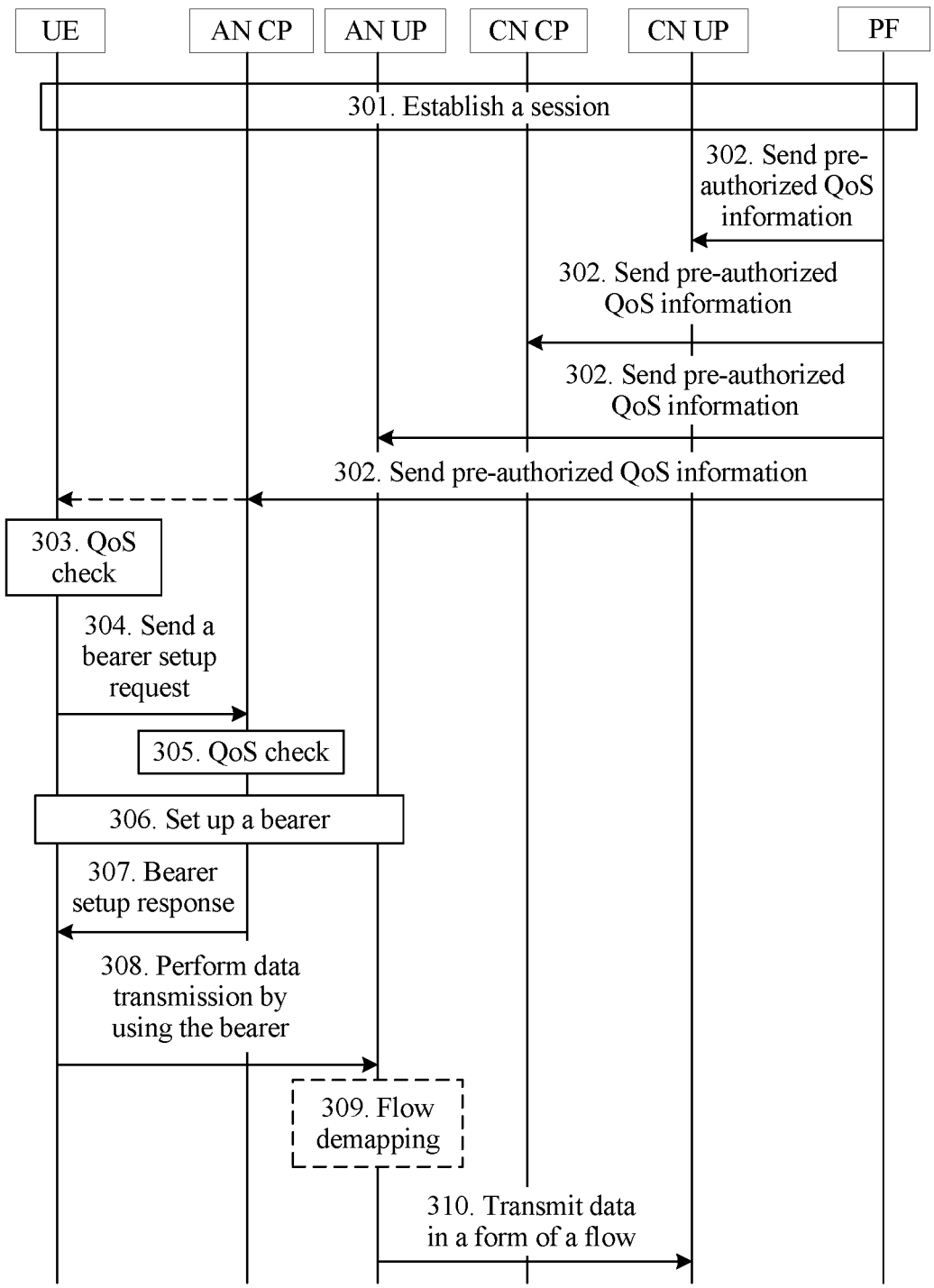
FIG. 3 is a schematic interaction diagram of a communication method according to an embodiment of this application.

FIG. 3 is a schematic interaction diagram of a communication method according to an embodiment of this application. As shown in FIG. 3, the method includes the following steps.

301. After a user successfully accesses a network, a session (session) is established between the UE and the network. In this process, the UE obtains an identifier used to communicate with a data network, for example, an IP address. The session may be a protocol data unit (Protocol Data Unit, PDU) session.

302. A policy functional entity separately sends pre-authorized QoS information to a CN CP functional entity, a CN UP functional entity, an AN CP functional entity, an AN UP functional entity, and the UE. The CN CP functional entity, the CN UP functional entity, the AN CP functional entity, the AN UP functional entity, and the UE receive the pre-authorized QoS information.

The pre-authorized QoS information includes information about a service pre-authorized by the network to the UE and QoS information corresponding to the service. The service information may be a service type, a specific service identifier, or other information that can reflect a property of the service. The QoS information may include a priority, delay, or a packet loss rate. The pre-authorized QoS information may further include a UE ID.

If there is a direct interface between the policy functional entity and each of the CN CP functional entity, the CN UP functional entity, the AN CP functional entity, and the AN UP functional entity, the policy functional entity can directly and separately send the pre-authorized QoS information to the CN CP functional entity, the CN UP functional entity, the AN CP functional entity, and the AN UP functional entity. If there is a direct interface between the policy functional entity and each of the CN CP functional entity and the AN CP functional entity, but there is no direct interface between the policy functional entity and each of the CN UP functional entity and the AN UP functional entity, the policy functional entity can directly and separately send the pre-authorized QoS information to the CN CP functional entity and the AN CP functional entity, and send the pre-authorized QoS information to the CN UP functional entity and the AN UP functional entity by using the CN CP functional entity and the AN CP functional entity. The policy functional entity may transparently transmit the pre-authorized QoS information to the UE by using the AN CP functional entity.

Alternatively, the UE may obtain the pre-authorized QoS information through subscription. If the UE has obtained the pre-authorized QoS information, in this step, the policy functional entity does not need to send the pre-authorized QoS information to the UE.

303. When the UE needs to transmit an uplink data flow, the UE checks QoS authorization information of the data flow. When the data flow is a new data flow and belongs to the service pre-authorized by the network to the UE, step 304 is performed.

304. The UE sends a bearer setup request to the AN CP functional entity. The AN CP functional entity receives the bearer setup request. The bearer setup request carries an identifier of the UE and a descriptor of the data flow. The descriptor of the data flow is used to describe information about the data flow, such as a property of a service corresponding to the data flow. The bearer setup request is triggered when the UE transmits the data flow. Optionally, the bearer setup request may further carry pre-authorized QoS information.

305. The AN CP functional entity performs QoS check on the data flow in the bearer setup request based on the previously received pre-authorized QoS information. If the AN CP functional entity determines that the data flow is a new data flow and belongs to the service included in the pre-authorized QoS information, step 306 is performed. If the bearer setup request of the UE also includes pre-authorized QoS information, the AN CP functional entity needs to compare the pre-authorized QoS information with the previously received pre-authorized QoS information; and if the pre-authorized QoS information is inconsistent with the previously received pre-authorized QoS information, the AN CP functional entity rejects the bearer setup request of the UE, or makes judgment based on pre-authorized QoS stored by the AN CP functional entity.

306. The AN CP functional entity initiates setup of a bearer between the UE and the AN UP functional entity. The bearer may be a dedicated (dedicated) data bearer.

In a process of setting up the bearer, the AN CP functional entity generates a bearer identifier, and the identifier may be used to identify the bearer. The AN CP functional entity configures a QoS parameter for the bearer, for example, a QoS priority or whether a resource needs to be reserved. The AN CP functional entity further allocates a corresponding network resource to the bearer based on pre-authorized QoS requirement information. The network resource may be bandwidth, a storage resource, or the like. The AN CP functional entity may further establish and maintain a mapping relationship between the data flow and the bearer. The mapping relationship may be embodied by using a filter or a table. In addition, the mapping relationship may be delivered to the UE, and the UE may obtain, based on the mapping relationship, which data flows may be mapped onto the bearer.

307. The AN CP functional entity sends a bearer setup response to the UE. The UE receives the bearer setup response. The bearer setup response includes a bearer identifier. The bearer identifier is an identifier of a bearer that is set up. Optionally, the bearer setup response may further include a bearer setup success indication.

308. The UE sends, to the AN UP functional entity by using the bearer, a data flow that is able to be mapped onto the bearer. The AN UP functional entity receives the data flow. The data flow in step 308 may be not only the data flow mentioned in step 303. Because after the bearer is set up, the data flow in step 303 may be transmitted, or a new data flow may be transmitted. For differentiation, the data flow mentioned in steps 303 to 307 may be referred to as a first data flow, and the data flow mentioned in steps 308 to 310 may be referred to as a second data flow. The second data flow and the first data flow have a same Quality of Service attribute, or the second data flow is able to be mapped onto the bearer that is set up.

309. If data-flow-based transmission is performed on a CN, after the data flow is transmitted to the AN UP functional entity by using the bearer, the AN UP functional entity may demap the data flow. The bearer that is set up in step 306 may be mapped onto a plurality of data flows, and therefore the data flows on the bearer may be transmitted after being demapped by an AN.

The AN UP functional entity transmits data to the CN UP functional entity in a form of a data flow.

In this embodiment, for a pre-authorized data flow, service authorization does not need to be performed when the bearer is set up, and a functional entity that participates in bearer setup is only in the AN, and a relatively small quantity of related network elements are involved, so that a process can be simplified and bearer setup can be accelerated.

Figure 4:
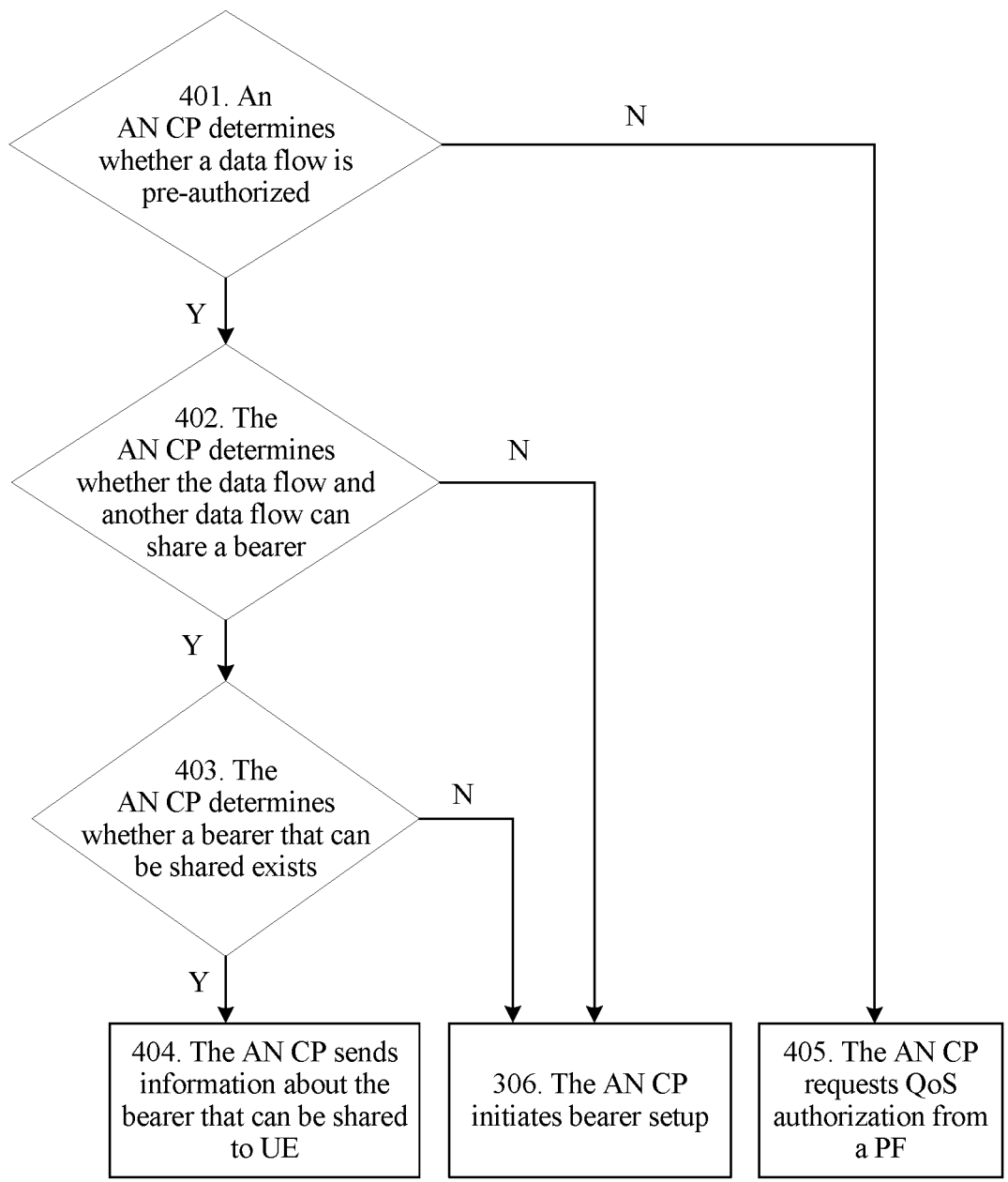
FIG. 4 is a schematic flowchart of a method for performing QoS check by an AN CP functional entity according to an embodiment of this application.

FIG. 4 is a flowchart of a method for performing QoS check in step 305 by an AN CP functional entity according to an embodiment of this application. As shown in FIG. 4, the QoS check method may include the following steps:

401. The AN CP functional entity determines whether the data flow described by the descriptor of the data flow in the bearer setup request falls within a pre-authorized scope, and if the data flow described by the descriptor of the data flow in the bearer setup request falls within the pre-authorized scope, step 402 is performed. If the data flow described by the descriptor of the data flow in the bearer setup request does not fall within the pre-authorized scope, step 405 may be performed.

402. The AN CP functional entity checks whether the data flow and another data flow can share one bearer, and if the data flow and the another data flow cannot share one bearer, step 306 is performed, that is, the AN CP functional entity initiates a bearer setup process. If the data flow and the another data flow can share one bearer, step 403 is performed. A data flow—bearer mapping manner may be 1:1, or may be N:1. For example, if the mapping manner is 1:1, the data flow and the another data flow cannot share one bearer. If the mapping manner is N:1, the data flow and the another data flow can share one bearer.

403. The AN CP functional entity checks whether the bearer that is set up includes a bearer that can be shared, and if the bearer that is set up includes a bearer that can be shared, step 404 is performed. If the bearer that is set up does not include a bearer that can be shared, step 306 is performed.

404. The AN CP functional entity sends information about the bearer that can be shared to the UE. The bearer information may be the identifier of the bearer.

405. If the data flow requested by the UE does not fall within the pre-authorized scope, the AN CP functional entity needs to initiate an authorization request to the PF functional entity. In the embodiment shown in FIG. 5, this process is described in detail.

Figure 5:
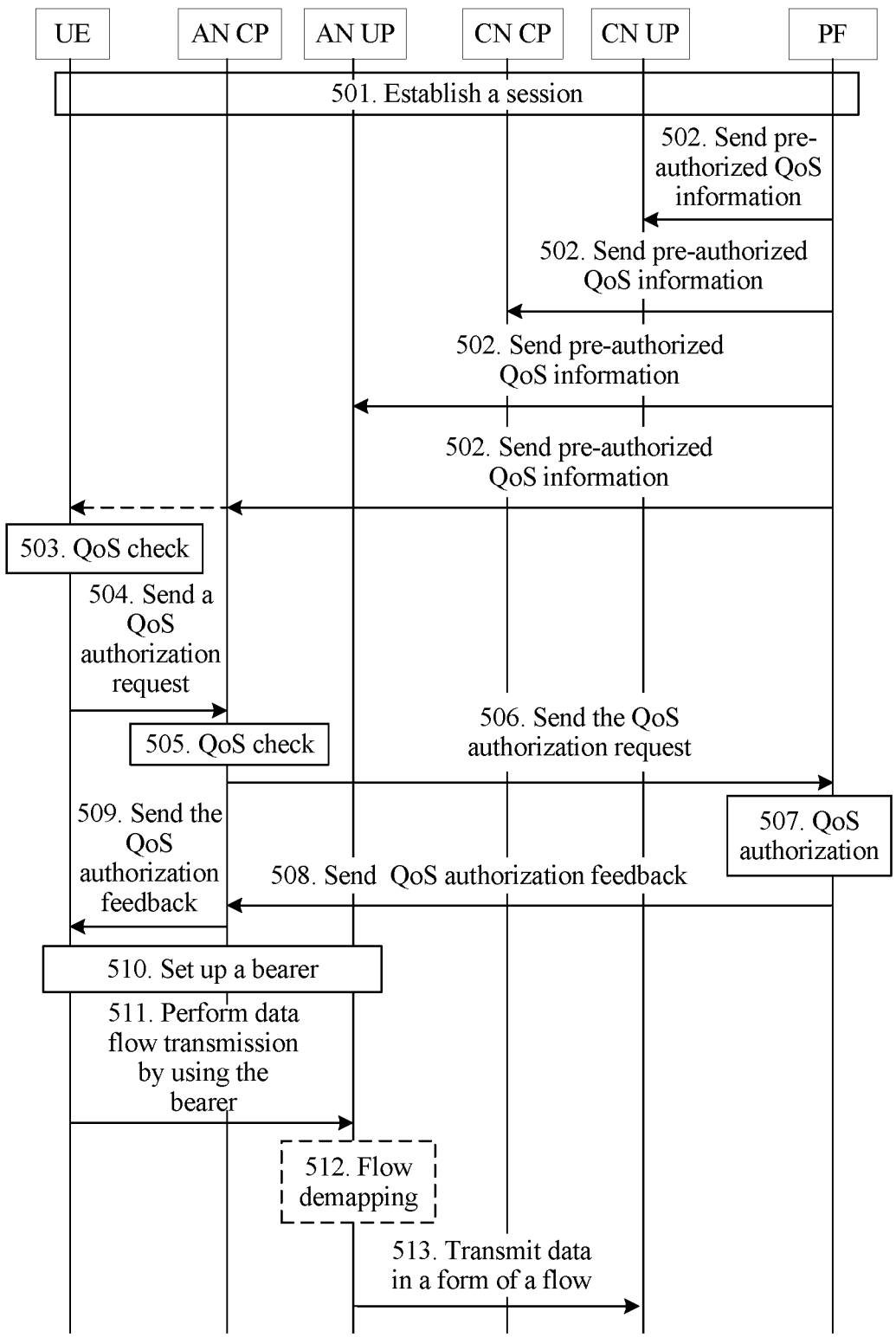
FIG. 5 is a schematic interaction diagram of a communication method according to another embodiment of this application.

FIG. 5 is a schematic interaction diagram of a communication method according to another embodiment of this application. This embodiment discloses a processing solution for a scenario in which an uplink data flow is not a pre-authorized data flow. As shown in FIG. 5, the method includes the following steps:

Steps 501 and 502 are basically the same as steps 301 and 302, and details are not described again.

503. When the UE needs to transmit an uplink data flow, the UE checks QoS authorization information of the data flow. When the data flow is a new data flow and does not belong to a service pre-authorized by the network to the UE, step 504 is performed.

504. The UE sends a QoS authorization request to the AN CP functional entity. The AN CP functional entity receives the QoS authorization request. The QoS authorization request includes a descriptor of the data flow and QoS information corresponding to the data flow, for example, a delay rate and a latency requirement, and may further include a data flow priority or the like.

505. The AN CP functional entity performs QoS authorization information check on the data flow described by the descriptor of the data flow in the QoS authorization request; and when the data flow does not fall within a pre-authorized scope, step 506 is performed.

506. The AN CP functional entity sends the QoS authorization request to the policy functional entity. The policy functional entity receives the QoS authorization request. The QoS authorization request is used to request the policy functional entity to perform QoS authorization on the data flow. The QoS authorization request may include a UE ID and the descriptor of the data flow. The QoS authorization request may further include requested QoS information.

507. The policy functional entity performs QoS authorization on the QoS authorization request based on subscription information of the UE and/or a carrier policy. Specifically, the policy functional entity checks, based on the subscription information of the UE, whether a service type corresponding to the data flow requested by the user falls within an authorized scope of the network. The carrier policy specifically includes a network status and/or a resource capability, and the policy functional entity further determines, based on the network status and/or the resource capability, whether to perform QoS authorization on the QoS authorization request.

508. The policy functional entity sends a QoS authorization response to the AN CP functional entity. The AN CP functional entity receives the QoS authorization response. The QoS authorization response includes authorized QoS information.

509. The AN CP functional entity sends the QoS authorization response to the UE. The UE receives the QoS authorization response.

510. The AN CP functional entity checks a QoS attribute of the data flow, and if the data flow and another data flow can share one bearer, and a bearer that can be shared already exists between the UE and an AN, the AN CP functional entity feeds back an identifier of the bearer to the UE. If the data flow and the another data flow cannot share one bearer, a new bearer needs to be set up, and the AN CP functional entity feeds back an identifier of the new bearer to the UE.

For information about setting up a bearer between the UE and the AN UP, refer to step 306.

Steps 511 to 513 are basically the same as steps 308 to 310. Details are not described herein again.

A data flow that can be transmitted after the bearer is set up is not limited to the data flow mentioned in steps 503 to 509. For differentiation, the data flow mentioned in steps 503 to 509 may be referred to as a first data flow, and the data flow mentioned in step 511 may be referred to as a second data flow. The second data flow and the first data flow have a same Quality of Service attribute, or the second data flow is able to be mapped onto the bearer that is set up.

Figure 6:
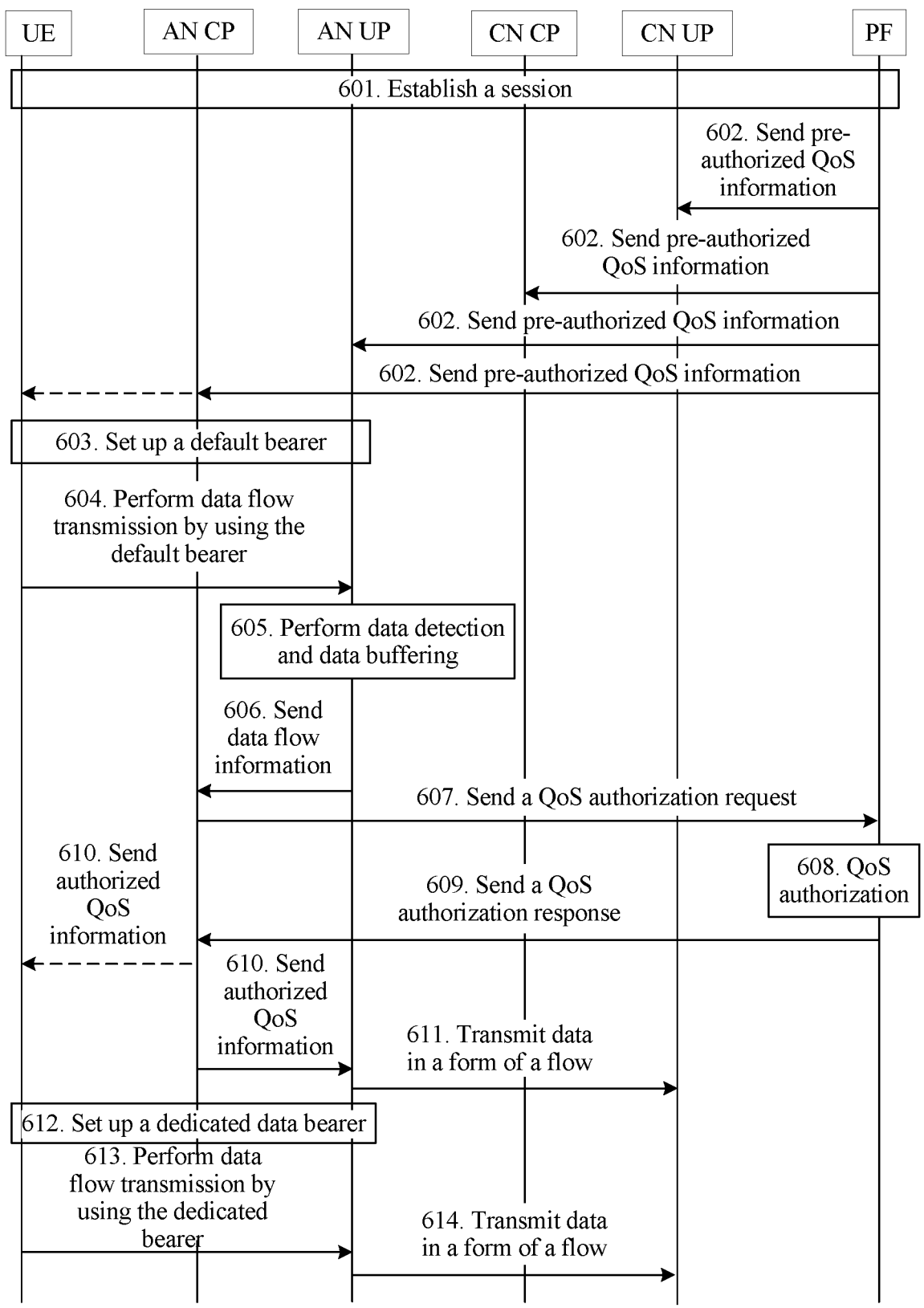
FIG. 6 is a schematic interaction diagram of a communication method according to another embodiment of this application.

FIG. 6 is a schematic interaction diagram of a communication method according to another embodiment of this application. As shown in FIG. 6, the method includes the following steps:

Steps 601 and 602 are basically the same as steps 301 and 302.

603. Set up a default bearer between the AN UP functional entity and the UE, where the default bearer is corresponding to a set of QoS parameters preset by the network. The default bearer exists after the session is established and until the session is completed. A process of setting up the default bearer mainly includes that: The AN CP functional entity generates an identifier of the default bearer, where the identifier is used to identify the default bearer between the UE and the AN UP functional entity, and the identifier of the default bearer is sent to the UE. The AN CP functional entity allocates a corresponding network resource, such as bandwidth or a storage resource, to the default bearer based on a default QoS configuration parameter preset by the network. It should be noted that in this embodiment, step 602 and step 603 are not sequentially performed, and step 602 may be performed first, or step 603 may be performed first, or steps 602 and step 603 are performed simultaneously.

604. When the UE needs to transmit an uplink data flow, the UE checks QoS authorization information of the data flow. When the data flow is a new data flow and does not belong to a service pre-authorized by the network to the UE, the UE transmits the data flow to the AN UP functional entity by using the default bearer. When the data flow is sent, a descriptor of the data flow needs to be included.

605. The AN UP functional entity performs data detection on the received data flow; and if it is detected that the corresponding data flow is a new data flow, the AN UP functional entity buffers the data flow sent by the UE on the default bearer, and step 606 is performed. Optionally, the AN UP functional entity may further extract QoS information of the data flow.

606. The AN UP functional entity sends information about the data flow to the AN CP functional entity. The AN CP functional entity receives the information about the data flow. The information about the data flow may include the descriptor of the data flow and a UE ID.

Steps 607 to 609 are basically the same as steps 506 to 508, and details are not described again.

610. The AN CP functional entity sends the authorized QoS information to the AN UP functional entity. The AN UP functional entity receives the authorized QoS information. The authorized QoS information includes the UE ID and QoS information that is authorized to the UE and that is related to the data flow. The AN CP functional entity may further send the authorized QoS information to the UE. The AN CP functional entity may further send the authorized QoS information to the CN CP functional entity. Correspondingly, the UE receives the authorized QoS information.

611. The AN UP functional entity sends the buffered data to the CN CP functional entity. The CN CP functional entity receives the data. If data-flow-based transmission is performed on a CN, the AN UP functional entity may transmit the buffered data in a form of a flow.

612. The AN CP functional entity initiates setup of a dedicated data bearer between the UE and the AN UP functional entity.

In a process of setting up the bearer, the AN CP functional entity generates a bearer identifier, and the identifier may be used to identify the bearer to be set up. The bearer identifier is further separately sent to the UE and the AN UP functional entity. The AN CP functional entity further allocates a corresponding network resource to the bearer based on QoS authorized by the PF functional entity. The network resource may be bandwidth, a storage resource, or the like. The AN CP functional entity may further establish and maintain a mapping relationship between the data flow and the bearer. The mapping relationship may be embodied by using a filter or a table. In addition, the mapping relationship may be delivered to the UE, and the UE may obtain, based on the mapping relationship, which data flows may be mapped onto the data bearer.

613. The UE sends the data flow to the AN UP functional entity by using the bearer that is set up. The AN UP functional entity receives the data flow. A data flow that can be transmitted after the bearer is set up is not limited to the data flow mentioned in steps 604 to 611. For differentiation, the data flow mentioned in steps 604 to 611 may be referred to as a first data flow, and the data flow mentioned in step 613 may be referred to as a second data flow. The second data flow and the first data flow have a same Quality of Service attribute, or the second data flow is able to be mapped onto the bearer that is set up.

Step 614 is basically the same as step 310, and details are not described again.

In this embodiment, a step similar to step 512 may be further included before step 611 and step 614.

In this embodiment, after the session between the UE and the network is established, the default bearer is first set up between the UE and the AN, and the default bearer is corresponding to a default QoS level set by the network. The default bearer can ensure that basic services of a user are normally implemented, such as voice services and short message services. When the user needs to transmit a new data flow, the data is transmitted first on the default bearer, and at the same time, the network is triggered to perform QoS authorization and set up a dedicated bearer. After the dedicated bearer is set up, the data is transferred from the default bearer to the dedicated bearer for transmission. Data transmission latency can be reduced when data is first transmitted by using the default bearer. Setup of the dedicated bearer may ensure better QoS.

In the embodiment shown in FIG. 6, for an unauthorized data flow, an AN triggers service authorization and buffers some data of UE at the same time, and after authorization succeeds, the data flow is combined and sent, thereby improving data transmission efficiency.

The embodiment shown in FIG. 7A and FIG. 7B or FIG. 8A and FIG. 8B may be applied to the network system shown in FIG. 2. The AN CP in FIG. 7A and FIG. 7B or FIG. 8A and FIG. 8B may be the first AN CP functional entity in FIG. 2, the AN UP may be the first AN UP functional entity in FIG. 1, the CN CP may be the second CN CP functional entity in FIG. 2, the CN UP may be the second CN UP functional entity in FIG. 2, and the PF may be the second PF functional entity in FIG. 2.

Figure 7A:
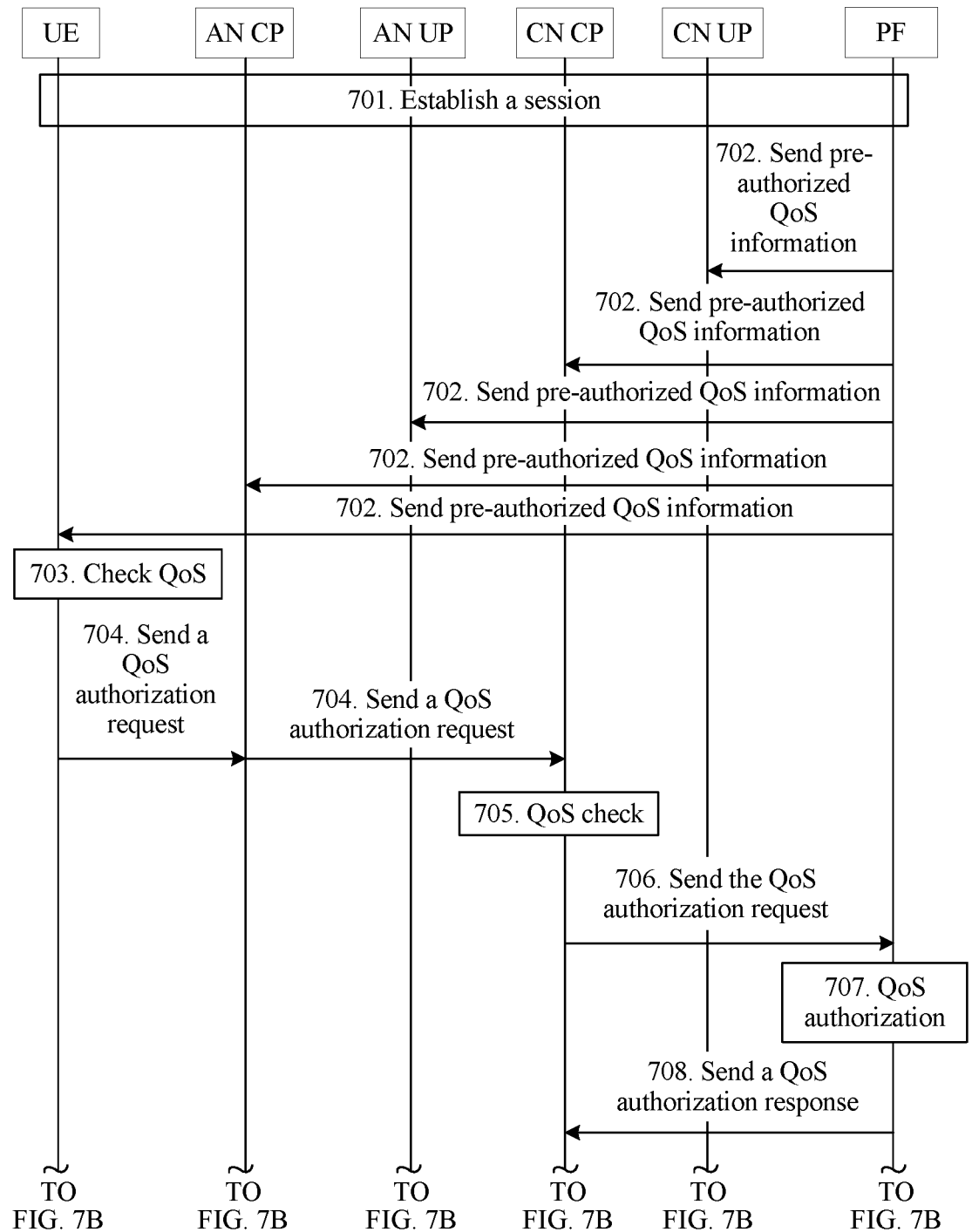
FIG. 7A and FIG. 7B are a schematic interaction diagram of a communication method according to another embodiment of this application.
Figure 7B:
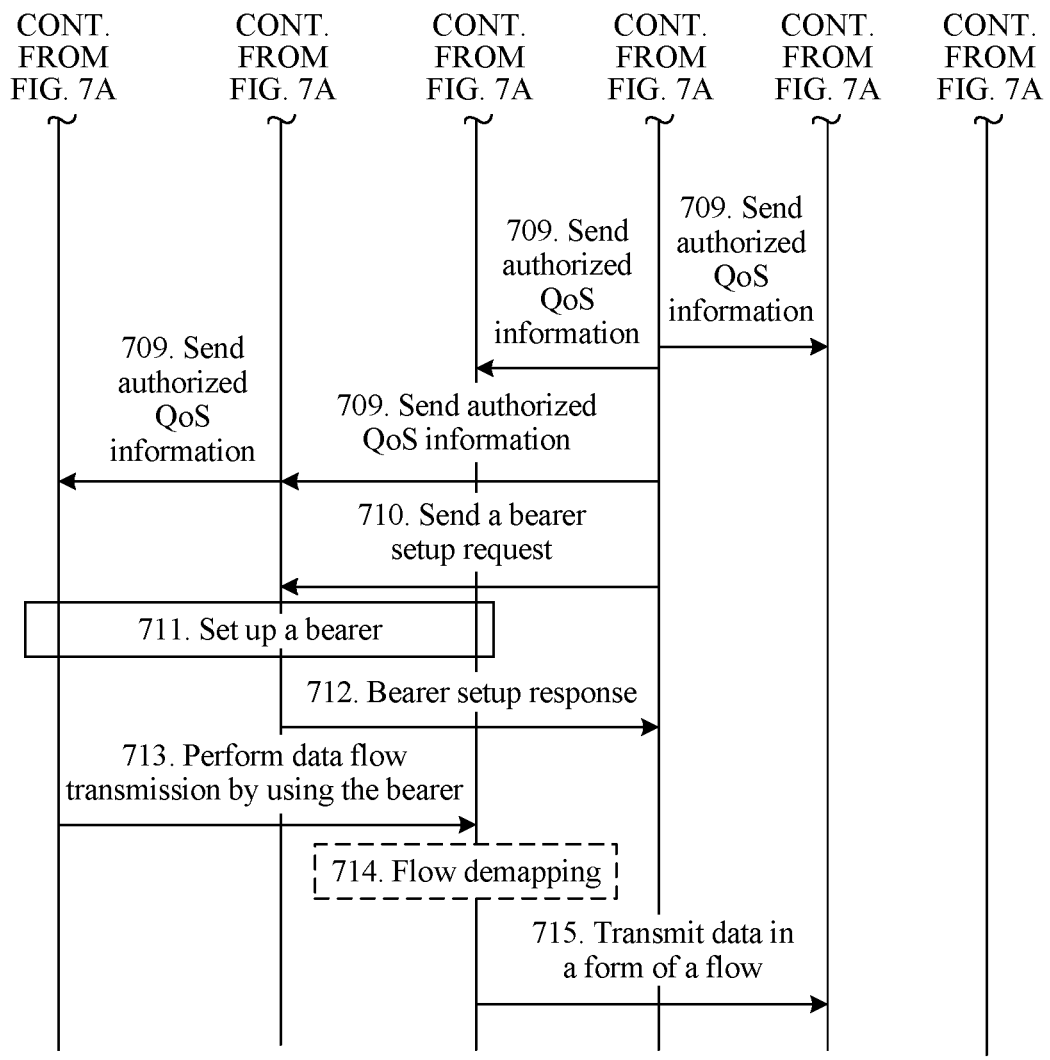

FIG. 7A and FIG. 7B are a schematic interaction diagram of a communication method according to another embodiment of this application. This embodiment discloses a processing solution for a scenario in which an uplink data flow is not a pre-authorized data flow. As shown in FIG. 7A and FIG. 7B, the method includes the following steps:

Steps 701 to 703 are basically the same as steps 501 to 503.

704. The UE sends a QoS authorization request to the CN CP functional entity. The CN CP functional entity receives the QoS authorization request. When sending the QoS authorization request to the CN CP functional entity, the UE may forward the QoS authorization request by using the AN CP functional entity. The QoS authorization request may include a UE ID and a descriptor of the data flow. The QoS authorization request may further include requested QoS information.

705. The CN CP functional entity performs QoS authorization information check on the data flow described by the descriptor of the data flow in the QoS authorization request; and when the data flow does not fall within a pre-authorized scope, step 706 is performed.

706. The CN CP functional entity sends the QoS authorization request to the policy functional entity. The policy functional entity receives the QoS authorization request. The QoS authorization request may include the UE ID and the descriptor of the data flow. The QoS authorization request may further include the requested QoS information.

Step 707 is basically the same as step 507.

708. The policy functional entity sends a QoS authorization response to the CN CP functional entity. The CN CP functional entity receives the QoS authorization response. The QoS authorization response includes QoS authorized to the UE.

709. The CN CP functional entity separately sends authorized QoS information to the CN UP functional entity, the AN UP functional entity, the AN CP functional entity, and the UE. The CN UP functional entity, the AN UP functional entity, the AN CP functional entity, and the UE receive the authorized QoS information. The CN CP functional entity may send the authorized QoS information to the UE by using the AN CP functional entity. The authorized QoS information includes the UE ID and information about the QoS authorized to the UE.

710. The CN CP functional entity triggers an AN to initiate bearer setup. Specifically, the CN CP functional entity sends a bearer setup request to the AN CP functional entity. The AN CP functional entity receives the bearer setup request. The bearer setup request carries the identifier of the UE and the descriptor of the data flow. The descriptor of the data flow is used to describe information about the data flow, such as a property of a service corresponding to the data flow. Optionally, the bearer setup request may further carry pre-authorized QoS information.

Step 711 is basically the same as step 306.

712. The AN CP functional entity sends a bearer setup response to the CN CP functional entity. The CN CP functional entity receives the bearer setup response. The bearer setup response includes a bearer identifier. The bearer identifier is an identifier of a bearer that is set up. Optionally, the bearer setup response may further include a bearer setup success indication.

Steps 713 to 715 are basically the same as steps 308 to 310.

Figure 8A:
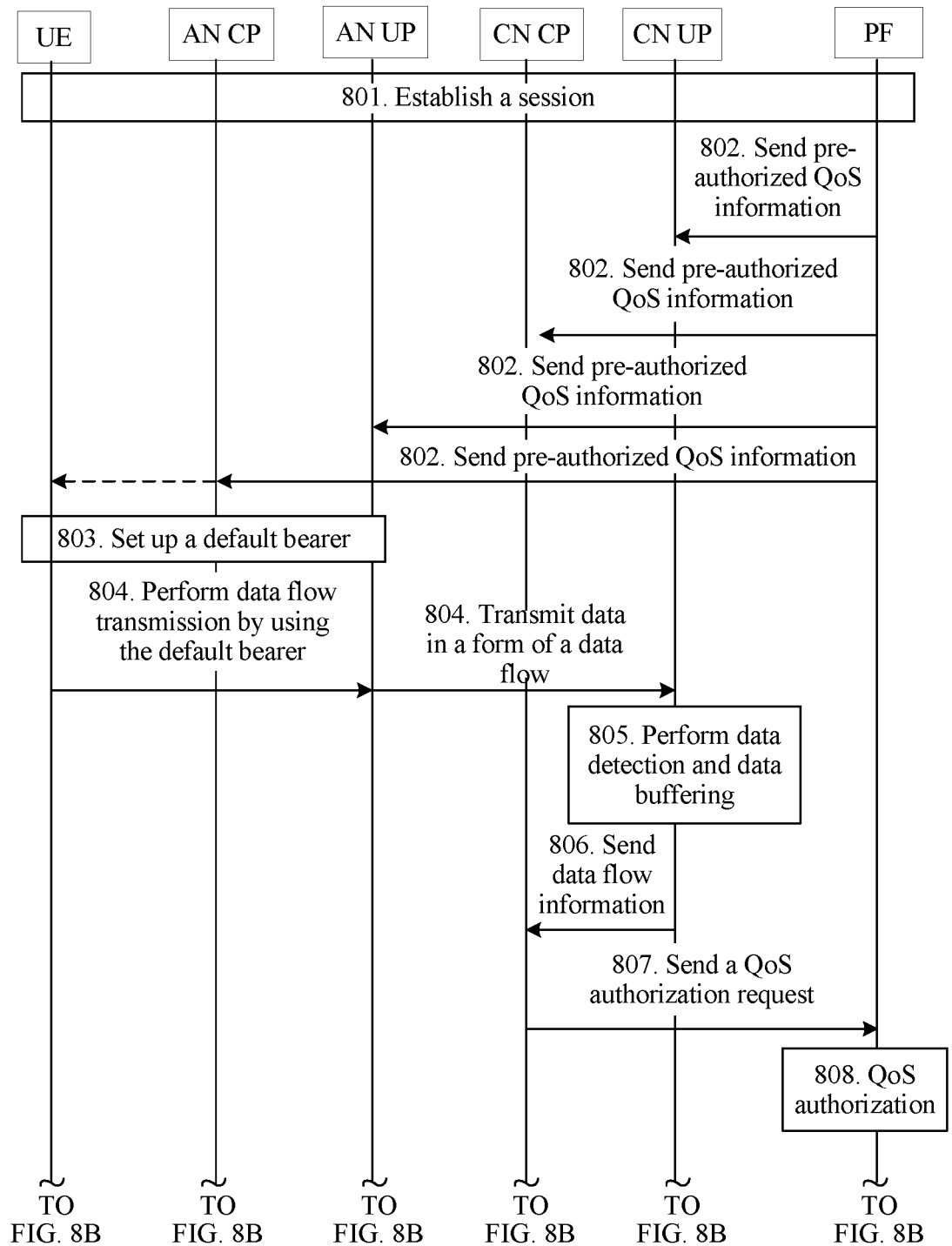
FIG. 8A and FIG. 8B are a schematic interaction diagram of a communication method according to another embodiment of this application.
Figure 8B:
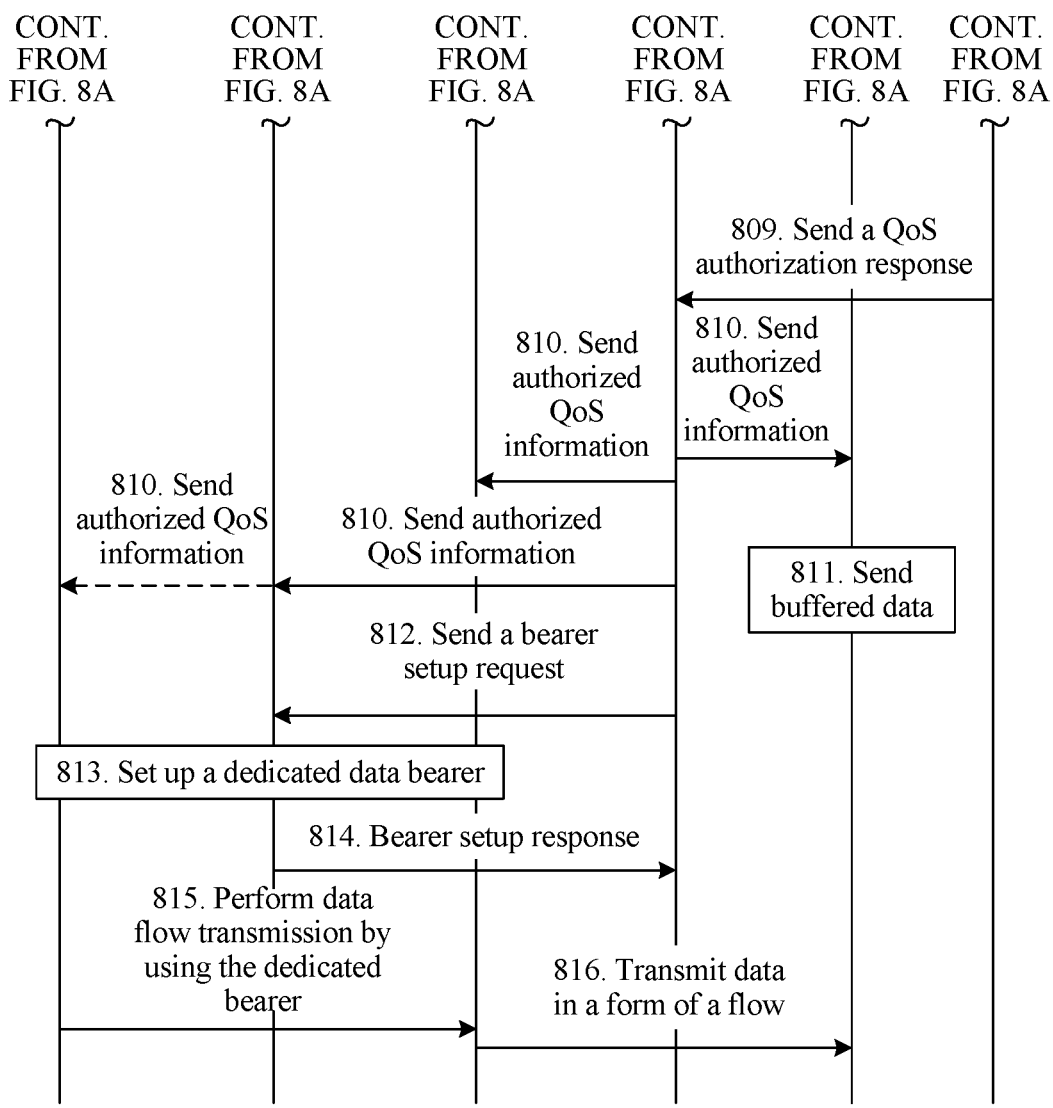

FIG. 8A and FIG. 8B are a schematic interaction diagram of a communication method according to another embodiment of this application. This embodiment discloses a processing solution for a scenario in which an uplink data flow is not a pre-authorized data flow. As shown in FIG. 8A and FIG. 8B, the method includes the following steps:

Steps 801 to 803 are basically the same as steps 601 to 603.

804. When the UE needs to transmit an uplink data flow, the UE sends the uplink data flow to the AN UP functional entity by using the default bearer. If data is transmitted in a form of a data flow on a CN, the AN UP functional entity forwards the data flow to the CN UP functional entity with a best effort (best effort) in the form of the data flow. When the data flow is sent, a descriptor of the data flow needs to be included.

805. The CN UP functional entity performs data detection on the received data flow; and if it is detected that the corresponding data flow is a new data flow, the CN UP functional entity buffers the data flow, and step 806 is performed. Optionally, the AN UP functional entity may further extract QoS information of the data flow.

806. The CN UP functional entity sends information about the data flow to the CN CP functional entity. The CN CP functional entity receives the information about the data flow. The information about the data flow includes the descriptor of the data flow and a UE ID.

807. The CN CP functional entity sends a QoS authorization request to the policy functional entity. The policy functional entity receives the QoS authorization request. The QoS authorization request may include the UE ID and the descriptor of the data flow. The QoS authorization request may further include requested QoS information.

Step 808 is basically the same as step 507.

809. The policy functional entity sends a QoS authorization response to the AN CP functional entity. The AN CP functional entity receives the QoS authorization response. The QoS authorization response includes authorized QoS information.

810. The CN CP functional entity separately sends the authorized QoS information to the CN UP functional entity and the AN CP functional entity. The CN UP functional entity and the AN CP functional entity receive the authorized QoS information. The authorized QoS information includes the UE ID and QoS information that is authorized to the UE and that is related to the data flow. The AN CP functional entity may further send the authorized QoS information to the UE and the AN UP functional entity. Correspondingly, the UE and the AN UP functional entity receive the authorized QoS information.

811. After the CN UP functional entity receives the authorized QoS information, the CN UP functional entity sends buffered data to the data network.

Steps 812 to 814 are basically the same as steps 710 to 712. It should be noted that there is no sequential order between step 811 and step 812. Step 811 and step 812 may be performed simultaneously, or step 811 is performed first, or step 812 is performed first.

Steps 815 and 816 are basically the same as steps 613 and 614, and details are not described again.

The foregoing uses uplink data transmission as an example for description, and downlink data transmission is similar to the uplink data transmission. In downlink data transmission, bearer setup is triggered by a CN, an AF, or a DN rather than UE. The following separately describes embodiments shown in FIG. 9 and FIG. 10 by using downlink procedures corresponding to the embodiments in FIG. 3 and FIG. 5 as examples. Downlink procedures corresponding to the embodiments shown in FIG. 6 to FIG. 8A and FIG.

8B are similar to the downlink procedures corresponding to the embodiments in FIG. 3 and FIG. 5, and details are not described again.

Figure 9:
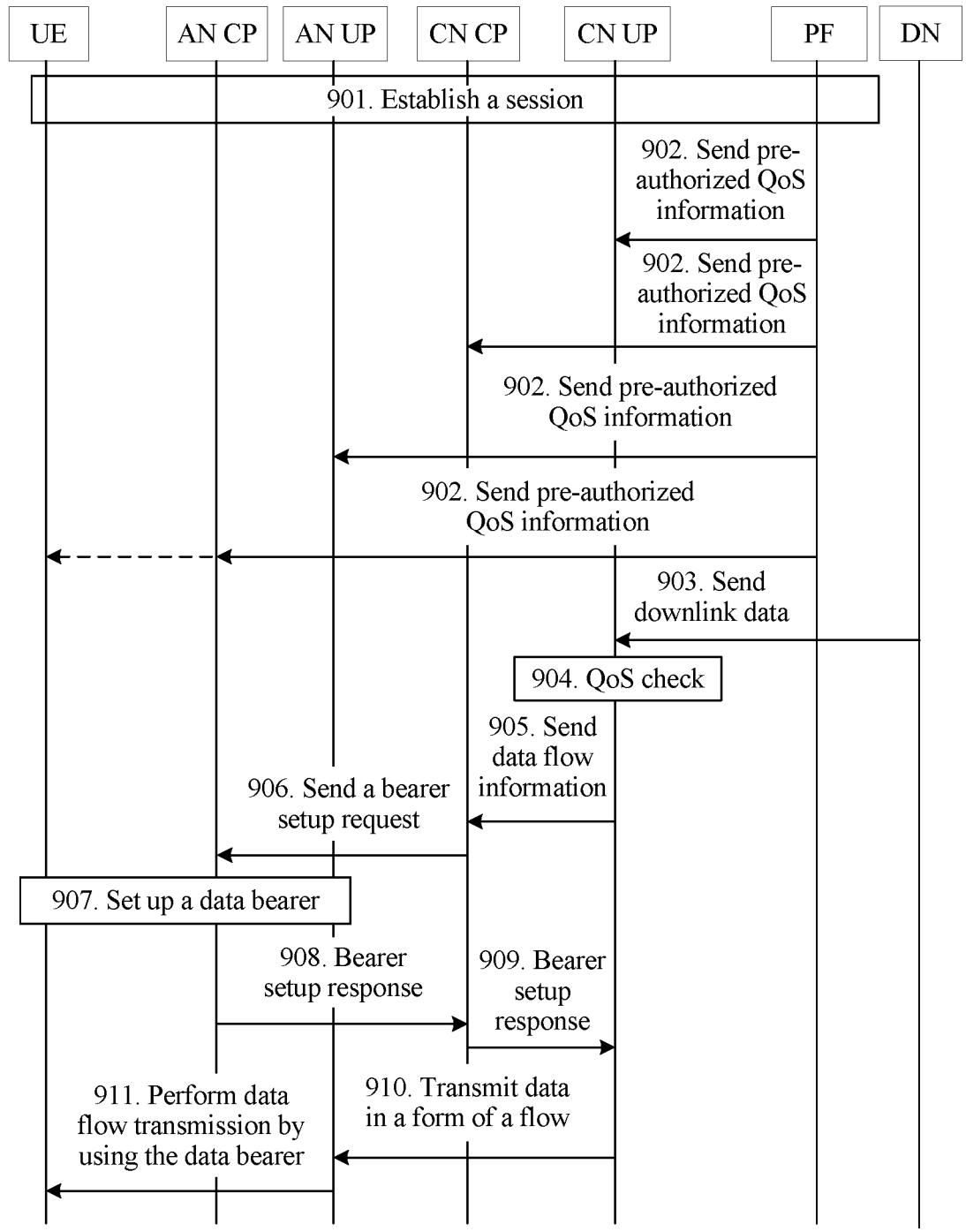
FIG. 9 is a schematic interaction diagram of a communication method according to another embodiment of this application.
Figure 10:
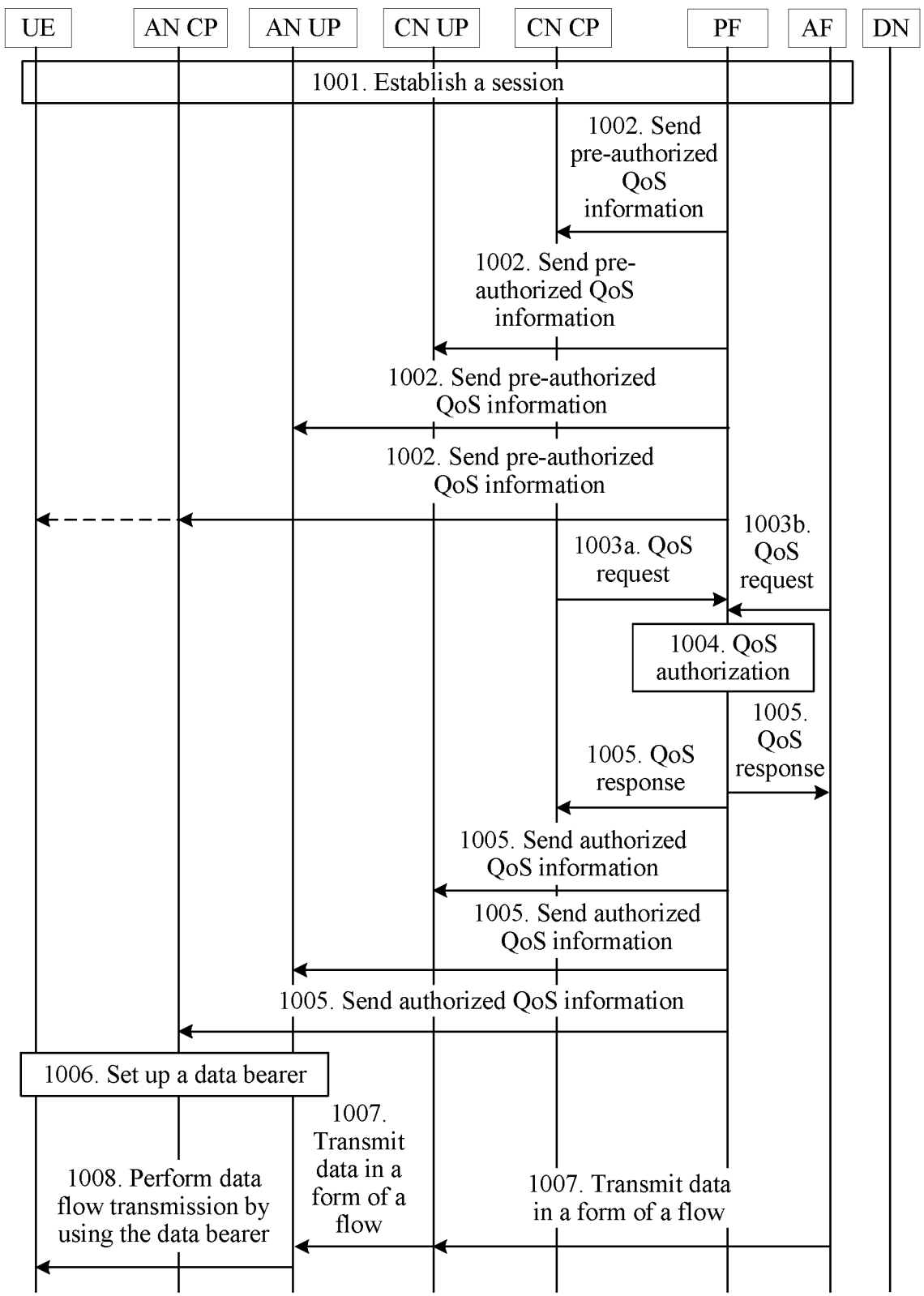
FIG. 10 is a schematic interaction diagram of a communication method according to another embodiment of this application.

The embodiments shown in FIG. 9 and FIG. 10 may be applied to the network system shown in FIG. 1. An AN CP in FIG. 9 and FIG. 10 may be the first AN CP functional entity in FIG. 1, an AN UP may be the first AN UP functional entity in FIG. 1, a CN CP may be the first CN CP functional entity in FIG. 1, a CN UP may be the first CN UP functional entity in FIG. 1, and a PF may be the first PF functional entity in FIG. 1.

FIG. 9 is a schematic interaction diagram of a communication method according to another embodiment of this application. As shown in FIG. 9, the method includes the following steps:

Steps 901 and 902 are basically the same as steps 301 and 302. Details are not described herein again.

903. The data network sends downlink data to the CN UP functional entity. The CN UP functional entity receives the downlink data.

904. The CN UP functional entity checks QoS authorization information of the data flow. When the data flow is a new data flow and belongs to a service pre-authorized by the network to the UE, step 905 is performed.

905. The CN UP functional entity sends information about the data flow to the CN CP functional entity. The CN CP functional entity receives the information about the data flow. The information about the data flow may include a descriptor of the data flow and a UE ID.

Steps 906 to 908 are basically the same as steps 710 to 712.

909. The CN CP functional entity sends information about the bearer to the CN UP functional entity. The CN UP functional entity receives a message of the bearer. The message of the bearer may include an identifier of the bearer.

910. The CN CP functional entity sends the data flow to the AN UP functional entity. The AN UP functional entity receives the data flow. Optionally, the AN UP functional entity may transmit data in a form of a flow.

911. The AN UP functional entity sends data to the UE by using the bearer, and the UE receives the data by using the bearer.

FIG. 10 is a schematic interaction diagram of a communication method according to another embodiment of this application. As shown in FIG. 10, the method includes the following steps:

Steps 1001 and 1002 are basically the same as steps 301 and 302. Details are not described herein again.

1003. Step 1003a or step 1003b may be performed. Step 1003a corresponds to that a carrier network needs to initiate a service to the UE; and step 1003b corresponds to that an application functional entity needs to initiate a service to the UE. Step 1003a is specifically that the CN CP functional entity sends a QoS authorization request to the policy functional entity. The policy functional entity receives the QoS authorization request. The QoS authorization request may include a UE ID, a service descriptor, or a service identifier, and may further include a to-be-requested service QoS requirement. Step 1003b is specifically that the application functional entity sends a QoS authorization request to the policy functional entity. The policy functional entity receives the QoS authorization request. The QoS authorization request may include a UE ID, a service descriptor, or a service identifier, and may further include a to-be-requested service QoS requirement.

1004. The policy functional entity performs QoS authorization on the QoS authorization request based on subscription information of the UE and/or a carrier policy. Specifically, the policy functional entity checks whether a service and a QoS requirement in the QoS authorization request fall within a subscription range of the UE, and may further make a proper adjustment based on a resource status of the network itself. For example, for some users who may allow an adjustment of a priority, when the network is congested, a relatively low priority of a related service may be authorized.

1005. The policy functional entity separately sends authorized QoS information to the CN CP functional entity, an AF entity, the CN UP functional entity, the AN UP functional entity, and the AN CP functional entity. The CN CP functional entity, the AF entity, the CN UP functional entity, the AN UP functional entity, and the AN CP functional entity receive the authorized QoS information. The authorized QoS information may include QoS information about a service of the QoS authorization request of the CN CP or the AF, for example, latency, a packet loss rate, or a priority.

1006. After the AN CP functional entity receives the authorized QoS information, the AN CP functional entity initiates setup of a bearer between the UE and the AN UP functional entity. The bearer may be a dedicated (dedicated) data bearer. For details about this step, refer to step 306.

1007. The data network sends a data flow to the AN UP functional entity by using the CN UP functional entity. The AN UP functional entity receives the data flow by using the CN UP functional entity. Optionally, the AN UP functional entity may transmit data in a form of a flow.

Step 1008 is basically the same as step 911.

Figure 11:
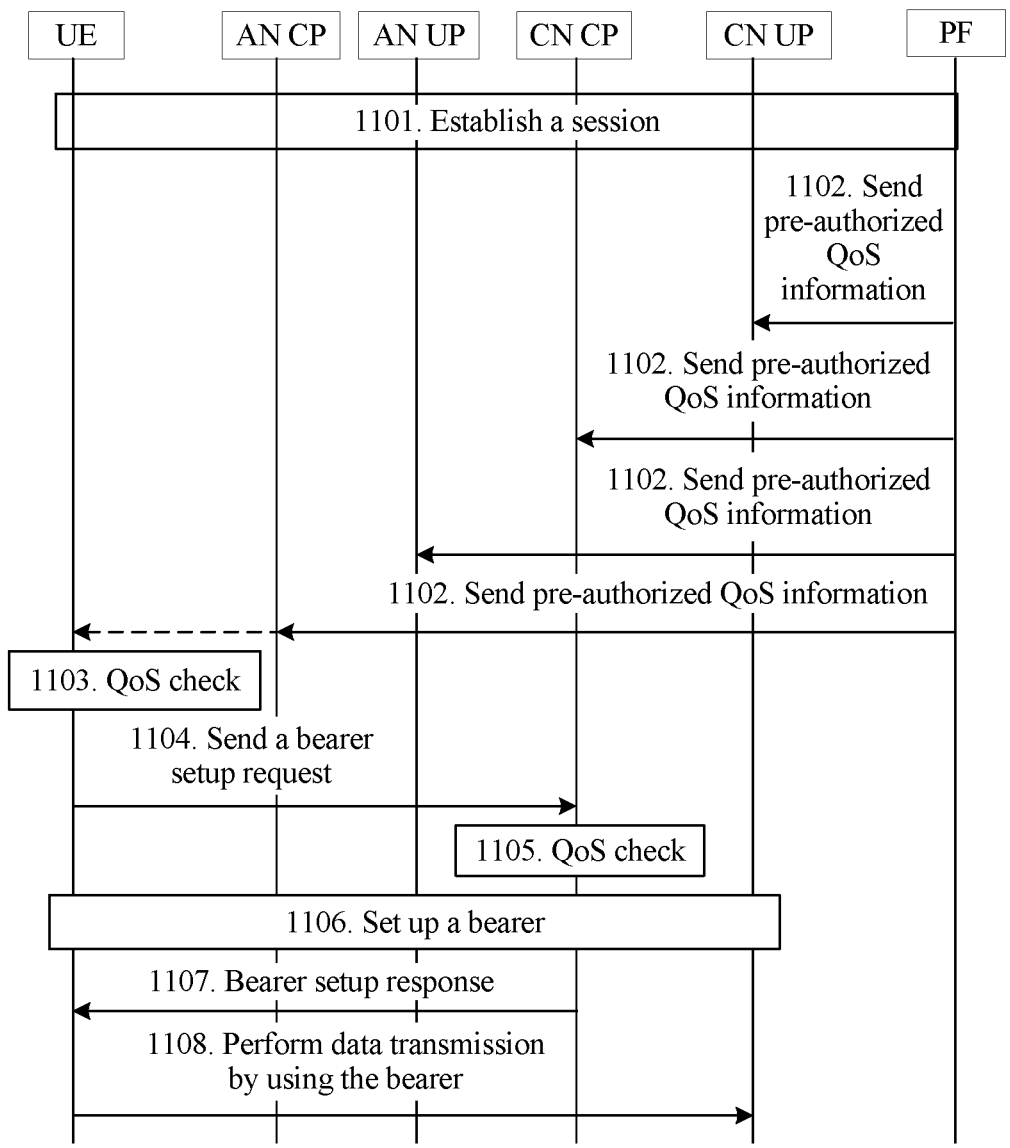
FIG. 11 is a schematic interaction diagram of a communication method according to another embodiment of this application.

In the foregoing embodiment, a scenario in which an AN uses a bearer and a CN uses a data flow is used as an example for description. It should be noted that the present invention is also applicable to a scenario in which both an AN and a CN use bearers. FIG. 11 is used as an example for description below. FIG. 11 is a schematic interaction diagram of a communication method according to another embodiment of this application. As shown in FIG. 11, the method includes the following steps:

Steps 1101 to 1103 are basically the same as steps 301 to 303.

1104. The UE sends a bearer setup request to the CN CP functional entity by using the AN CP functional entity. The AN CP functional entity receives the bearer setup request. The bearer setup request carries an identifier of the UE and a descriptor of the data flow. The descriptor of the data flow is used to describe information about the data flow, such as a property of a service corresponding to the data flow. Optionally, the bearer setup request may further carry pre-authorized QoS information.

1105. The CN CP functional entity performs QoS check on the data flow in the bearer setup request based on the previously received pre-authorized QoS information. If the CN CP functional entity determines that the data flow is a new data flow and belongs to the service included in the pre-authorized QoS information, step 1106 is performed. If the bearer setup request of the UE also includes pre-authorized QoS information, the CN CP functional entity needs to compare the pre-authorized QoS information with the previously received pre-authorized QoS information; and if the pre-authorized QoS information is inconsistent with the previously received pre-authorized QoS information, the CN CP functional entity rejects the bearer setup request of the UE, or makes judgment based on pre-authorized QoS stored by the AN CP functional entity.

1106. The CN CP functional entity initiates setup of a bearer between the UE and the AN UP functional entity, and between the CN UP functional entity and the AN UP functional entity, where the bearer may be a dedicated (dedicated) data bearer.

In a process of setting up the bearer, the CN CP functional entity generates a bearer identifier, and the identifier may be used to identify the bearer. The CN CP functional entity configures a QoS parameter for the bearer, for example, a QoS priority or whether a resource needs to be reserved. The CN CP functional entity further allocates a corresponding network resource to the bearer based on pre-authorized QoS requirement information. The network resource may be bandwidth, a storage resource, or the like. The CN CP functional entity may further establish and maintain a mapping relationship between the data flow and the bearer. The mapping relationship may be embodied by using a filter or a table. In addition, the mapping relationship may be delivered to the UE, and the UE may obtain, based on the mapping relationship, which data flows may be mapped onto the bearer.

1107. The CN CP functional entity sends a bearer setup response to the UE. The UE receives the bearer setup response. The bearer setup response includes the bearer identifier. The bearer identifier is an identifier of a bearer that is set up. Optionally, the bearer setup response may further include a bearer setup success indication.

1108. The UE sends, to the CN UP functional entity by using the bearer through the AN UP functional entity, a data flow that is able to be mapped onto the bearer. The CN UP functional entity receives the data flow by using the AN UP functional entity.

If the embodiment shown in FIG. 5 needs to be applicable to the scenario in which both the AN and the CN use bearers, step 510 needs to be modified to step 1106, and steps 511 to 513 need to be modified to step 1108.

If the embodiment shown in FIG. 6 needs to be applicable to the scenario in which both the AN and the CN use bearers, step 603 needs to be modified to: set up a default bearer between the UE and the AN UP functional entity, and between the CN UP functional entity and the AN UP functional entity. Step 611 is modified to: perform transmission by using the default bearer, and step 614 is modified to: perform transmission by using the dedicated bearer.

If the embodiment shown in FIG. 7A and FIG. 7B needs to be applicable to the scenario in which both the AN and the CN use bearers, step 711 needs to be modified to step 1106, and steps 713 to 715 need to be modified to step 1108.

If the embodiment shown in FIG. 8A and FIG. 8B needs to be applicable to the scenario in which both the AN and the CN use bearers, step 803 needs to be modified to: set up a default bearer between the UE and the AN UP functional entity, and between the CN UP functional entity and the AN UP functional entity. Step 804 is modified to: perform transmission between the AN UP functional entity and the CN UP functional entity by using the default bearer. Step 812 is modified to step 1106. Step 815 is modified to: perform transmission between the AN UP functional entity and the CN UP functional entity by using the dedicated bearer.

If the embodiment shown in FIG. 9 needs to be applicable to the scenario in which both the AN and the CN use bearers, step 907 needs to be modified to step 1106. Step 910 is modified to: perform transmission between the AN UP functional entity and the CN UP functional entity by using the bearer.

If the embodiment shown in FIG. 10 needs to be applicable to the scenario in which both the AN and the CN use bearers, step 1006 needs to be modified to step 1106. Step 1007 is modified to: perform transmission between the AN UP functional entity and the CN UP functional entity by using the bearer.

The foregoing mainly describes the solutions provided in the embodiments of the present invention from the perspective of interaction between network elements and processing by the network elements. It can be understood that to implement the foregoing functions, each network element includes a corresponding hardware structure and/or software module for executing the functions. A person skilled in the art may be easily aware that this application can be implemented in a form of hardware or a combination of hardware and computer software with reference to the disclosed embodiments of this specification. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of this application.

In this application, apparatus embodiments for implementing steps and methods in the foregoing method embodiments are further provided. It should be noted that the apparatus embodiments may be used in conjunction with the foregoing methods, and may also be independently used.

Figure 12:
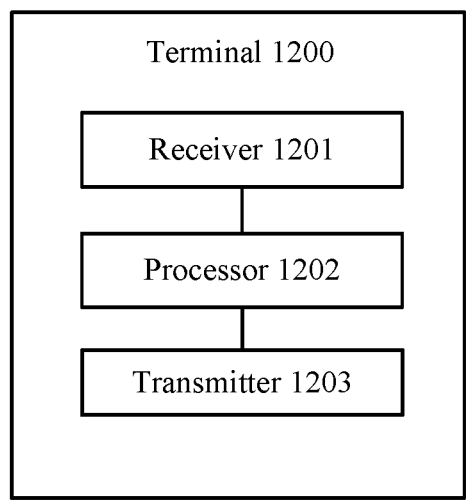
FIG. 12 is a schematic structural diagram of a terminal according to still another embodiment of the present invention.

FIG. 12 is a schematic structural diagram of a terminal according to still another embodiment of the present invention. As shown in FIG. 12, a terminal 1200 may include a receiver 1201, a processor 1202, and a transmitter 1203. The receiver 1201 and the transmitter 1203 are separately connected to the processor 1202.

The receiver 1201 may perform a receiving step of the UE in the foregoing method embodiments. The transmitter 1203 may perform a sending step of the UE in the embodiments. The processor 1202 may perform a processing step of the UE in the embodiments, for example, a check step.

Figure 13:
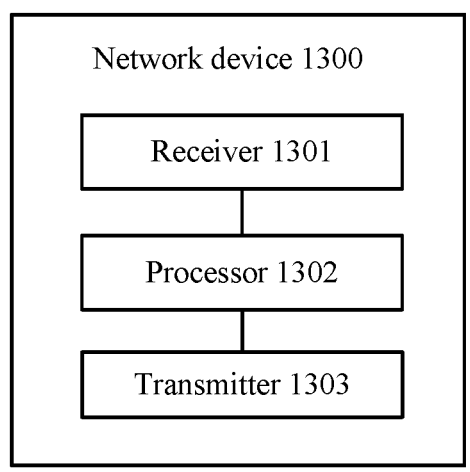
FIG. 13 is a schematic structural diagram of a network device according to still another embodiment of the present invention.

FIG. 13 is a schematic structural diagram of a network device according to still another embodiment of the present invention. As shown in FIG. 13, a network device 1300 may include a receiver 1301, a processor 1302, and a transmitter 1303. The receiver 1301 and the transmitter 1303 are separately connected to the processor 1302.

The network device 1300 may include an access network device, for example, may include an access network user plane device (which is corresponding to the access network user plane functional entity in the foregoing description) and/or an access network control plane device (which is corresponding to the access network control plane functional entity in the foregoing description).

When the network device 1300 includes an access network user plane device, the receiver 1301 may perform a receiving step of the access network user plane functional entity in the foregoing method embodiments; the transmitter 1303 may perform a sending step of the access network user plane functional entity in the embodiments; and the processor 1302 may perform a processing step of the access network user plane functional entity in the embodiments, for example, a check (detection) step, and/or a processing step, and/or a buffering step.

When the network device 1300 includes an access network control plane device, the receiver 1301 may perform a receiving step of the access network control plane functional entity in the foregoing method embodiments; the transmitter 1303 may perform a sending step of the access network control plane functional entity in the embodiments; and the processor 1302 may perform a processing step of the access network control plane functional entity in the embodiments, for example, a check step, and/or a processing step, and/or a detection step.

The network device may alternatively be a core network device, for example, may be a core network user plane device (which is corresponding to the core network user plane functional entity in the foregoing description), and/or a core network control plane device (which is corresponding to the access network control plane functional entity in the foregoing description), and/or a policy function device (which is corresponding to the policy functional entity in the foregoing description).

When the network device 1300 includes a core network user plane device, the receiver 1301 may perform a receiving step of the core network user plane functional entity in the foregoing method embodiments; the transmitter 1303 may perform a sending step of the core network user plane functional entity in the embodiments; and the processor 1302 may perform a processing step of the core network user plane functional entity in the embodiments, for example, a check (detection) step and/or a processing step.

When the network device 1300 includes a core network control plane device, the receiver 1301 may perform a receiving step of the core network control plane functional entity in the foregoing method embodiments; the transmitter 1303 may perform a sending step of the core network control plane functional entity in the embodiments; and the processor 1302 may perform a processing step of the core network control plane functional entity in the embodiments, for example, a check step, and/or a processing step, and/or a detection step.

When the network device 1300 includes a policy function device, the receiver 1301 may perform a receiving step of the policy functional entity in the foregoing method embodiments; the transmitter 1303 may perform a sending step of the policy functional entity in the embodiments; and the processor 1302 may perform a processing step of the policy functional entity in the embodiments, for example, a check step, and/or a processing step, and/or a detection step.

In the several embodiments provided in this application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electrical, mechanical, or other forms.

The units described as separate parts may or may not be physically separate. Parts displayed as units may or may not be physical units, and may be located in one position, or may be distributed on a plurality of network units. Some or all of the units may be selected based on actual requirements to achieve the objectives of the solutions of the embodiments.

In addition, functional units in the embodiments of this application may be integrated into one processing unit, or each of the units may exist alone physically, or two or more units may be integrated into one unit.

When functions are implemented in the form of a software functional unit and sold or used as an independent product, the functions may be stored in a computer-readable storage medium. Based on such an understanding, the technical solutions of this application essentially, or the part contributing to the prior art, or some of the technical solutions may be implemented in a form of a software product. The computer software product is stored in a storage medium, and includes several instructions for instructing a computer device (which may be a personal computer, a server, a network device, or the like) to perform all or some of the steps of the methods described in the embodiments of this application. The foregoing storage medium includes: any medium that can store program code, such as a USB flash drive, a removable hard disk, a read-only memory (ROM, Read-Only Memory), a random access memory (RAM, Random Access Memory), a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A wireless communication method, comprising:
    generating, by an access network device, an identifier of a default bearer;
    sending, by the access network device, the identifier of the default bearer to user equipment (UE);
    receiving, by the access network device, a first data flow from the UE on the default bearer, if there is no flow to bearer mapping relationship for the first data flow;
    sending, by the access network device, an identifier of a dedicated bearer and a mapping relationship between the first data flow and the dedicated bearer to the UE after receiving the first data flow on the default bearer, wherein the mapping relationship between the first data flow and the dedicated bearer comprises an N:1 mapping manner indicating N data flows are allowed to a same dedicated bearer and N is larger than 1; and
    receiving, by the access network device, a second data flow from the UE on the dedicated bearer, wherein the first data flow and the second data flow have a same Quality of Service (QoS) attribute.

2. The wireless communication method according to claim 1, the method further comprises:
    receiving, by the access network device, the first data flow from the UE on the dedicated bearer.

3. The wireless communication method according to claim 1, the method further comprises:
    generating, by the access network device, the identifier of the dedicated bearer after receiving the first data flow on the default bearer.

4. The wireless communication method according to claim 1,
    wherein the second data flow is able to be mapped onto the dedicated bearer.

5. The wireless communication method according to claim 1, further comprising:
    saving, by the access network device, the mapping relationship between the first data flow and the dedicated bearer.

6. The wireless communication method according to claim 1, the method further comprises:
    transferring, by the UE, transmission of the first data flow to the access network device from the default bearer to the dedicated bearer.

7. The wireless communication method according to claim 6, wherein the second data flow is able to be mapped onto the dedicated bearer.

8. The wireless communication method according to claim 1, the method further comprises:
buffering, by the access network device, the first data flow;
triggering, by the access network device, a QOS authorization process of the first data flow; and
after QOS authorization process succeeds, combining and sending the first data flow with another data flow.

9. A wireless communication method, comprising:
receiving, by user equipment (UE), an identifier of a default bearer from an access network device; and
sending, by the UE, a first data flow to the access network device on the default bearer, if there is no flow bearer mapping relationship for the first data flow;
receiving, by the UE, an identifier of a dedicated bearer and a mapping relationship between the first data flow and the dedicated bearer from the access network device after sending the first data flow on the default bearer, wherein the mapping relationship between the first data flow and the dedicated bearer comprises an N:1 mapping manner indicating N data flows are allowed to a same dedicated bearer and N is larger than 1; and
sending, by the UE, a second data flow on the dedicated bearer, wherein the first data flow and the second data flow have a same Quality of Service (QoS) attribute.

10. User equipment (UE), comprising:
a receiver, configured to receive an identifier of a default bearer from an access network device; and
a transmitter, configured to send a first data flow to the access network device on the default bearer, if there is no flow bearer mapping relationship for the first data flow;
wherein the receiver is further configured to receive an identifier of a dedicated bearer and a mapping relationship between the first data flow and the dedicated bearer from the access network device after sending the first data flow on the default bearer, wherein the mapping relationship between the first data flow and the dedicated bearer comprises an N:1 mapping manner indicating N data flows are allowed to a same dedicated bearer and N is larger than 1; and
wherein the transmitter is further configured to send a second data flow on the dedicated bearer, wherein the first data flow and the second data flow have a same Quality of Service (QoS) attribute.

11. The UE according to claim 10, wherein:
the transmitter is further configured to transfer transmission of the first data flow to the access network device from the default bearer to the dedicated bearer.

12. The UE according to claim 10, wherein:
the transmitter is further configured to send the first data flow to the access network device on the dedicated bearer if the second data flow is able to be mapped onto the dedicated bearer.

13. An access network device, comprising:
a transmitter, configured to send an identifier of a default bearer to user equipment (UE); and
a receiver, configured to: receive a first data flow from the UE on the default bearer, if there is no flow to bearer mapping relationship for the first data flow;
wherein the transmitter is further configured to send an identifier of a dedicated bearer and a mapping relationship between the first data flow and the dedicated bearer from the access network device after receiving the first data flow on the default bearer, wherein the mapping relationship between the first data flow and the dedicated bearer comprises an N:1 mapping manner indicating N data flows are allowed to a same dedicated bearer and N is larger than 1; and
wherein the receiver is further configured to receive a second data flow on the dedicated bearer, wherein the first data flow and the second data flow have a same Quality of Service (QoS) attribute.

14. The access network device according to claim 13, wherein:
the receiver is further configured to receive the first data flow from the UE on the dedicated bearer.

15. The access network device according to claim 13, further comprising at least one processor configured to generate the identifier of the dedicated bearer.

16. The access network device according to claim 13, wherein the second data flow is able to be mapped onto the dedicated bearer.

17. The access network device according to claim 13, further comprising a memory configured to save the mapping relationship between the first data flow and the dedicated bearer.

18. The access network device according to claim 13, further comprising:
a buffer configured to buffering the first data flow; and
at least one processor configured to:
trigger a QOS authorization process of the first data flow; and
after QOS authorization process succeeds, combine and cause the transmitter to send the first data flow with another data flow.

* * * * *